United States Patent
Atungsiri et al.

(10) Patent No.: US 8,203,929 B2
(45) Date of Patent: Jun. 19, 2012

(54) FRAME AND DATA PATTERN STRUCTURE FOR MULTI-CARRIER SYSTEMS

(75) Inventors: Samuel Asangbeng Atungsiri, Hampshire (GB); Joerg Robert, Vreden (DE); Lothar Stadelmeier, Stuttgart (DE)

(73) Assignee: Sony Corporation, Tokyo (JP)

( * ) Notice: Subject to any disclaimer, the term of this patent is extended or adjusted under 35 U.S.C. 154(b) by 127 days.

(21) Appl. No.: 12/563,772

(22) Filed: Sep. 21, 2009

(65) Prior Publication Data

US 2010/0135316 A1    Jun. 3, 2010

(30) Foreign Application Priority Data

Oct. 9, 2008   (EP) .................................. 08166268
Oct. 9, 2008   (EP) .................................. 08166275
Nov. 10, 2008  (EP) .................................. 08168755
Nov. 10, 2008  (EP) .................................. 08168757

(51) Int. Cl.
    *H04J 11/00*    (2006.01)
(52) U.S. Cl. ........ 370/203; 370/206; 370/208; 370/211; 370/204; 375/130; 375/259; 375/260; 375/268
(58) Field of Classification Search .......... 370/203–211, 370/430; 375/130, 259–260, 268
    See application file for complete search history.

(56) References Cited

U.S. PATENT DOCUMENTS

| | | | |
|---|---|---|---|
| 6,172,993 B1 | 1/2001 | Kim et al. | |
| 6,470,030 B1 * | 10/2002 | Park et al. | 370/480 |
| 6,760,362 B2 * | 7/2004 | Patel et al. | 375/147 |
| 6,952,182 B2 * | 10/2005 | Spilker et al. | 342/464 |
| 7,039,004 B2 * | 5/2006 | Sun et al. | 370/208 |

(Continued)

FOREIGN PATENT DOCUMENTS

EP    1 650 921 A2    4/2006

(Continued)

OTHER PUBLICATIONS

U.S. Appl. No. 12/499,456, filed Jul. 8, 2009, Stadelmeier, et al.

(Continued)

*Primary Examiner* — Kwang B Yao
*Assistant Examiner* — Benjamin H Elliott, IV
(74) *Attorney, Agent, or Firm* — Oblon, Spivak, McClelland, Maier & Neustadt, L.L.P.

(57) ABSTRACT

The present invention relates to a transmitting apparatus (82) for transmitting signals in a multi carrier system on the basis of a frame structure, each frame comprising at least one signalling pattern and one or more data patterns, said transmitting apparatus (82) comprising frame forming means (59) adapted to arrange first signalling data in said at least one signalling pattern in a frame, and adapted to arrange data in said one or more data patterns in a frame, whereby the data of said one or more data patterns are arranged in data frames, each data frame comprising second signalling data and content data, transforming means (60) adapted to transform said at least one signalling pattern and said one or more data patterns from the frequency domain into the time domain in order to generate a time domain transmission signal, and transmitting means (61) adapted to transmit said time domain transmission signal.

Figure 4:
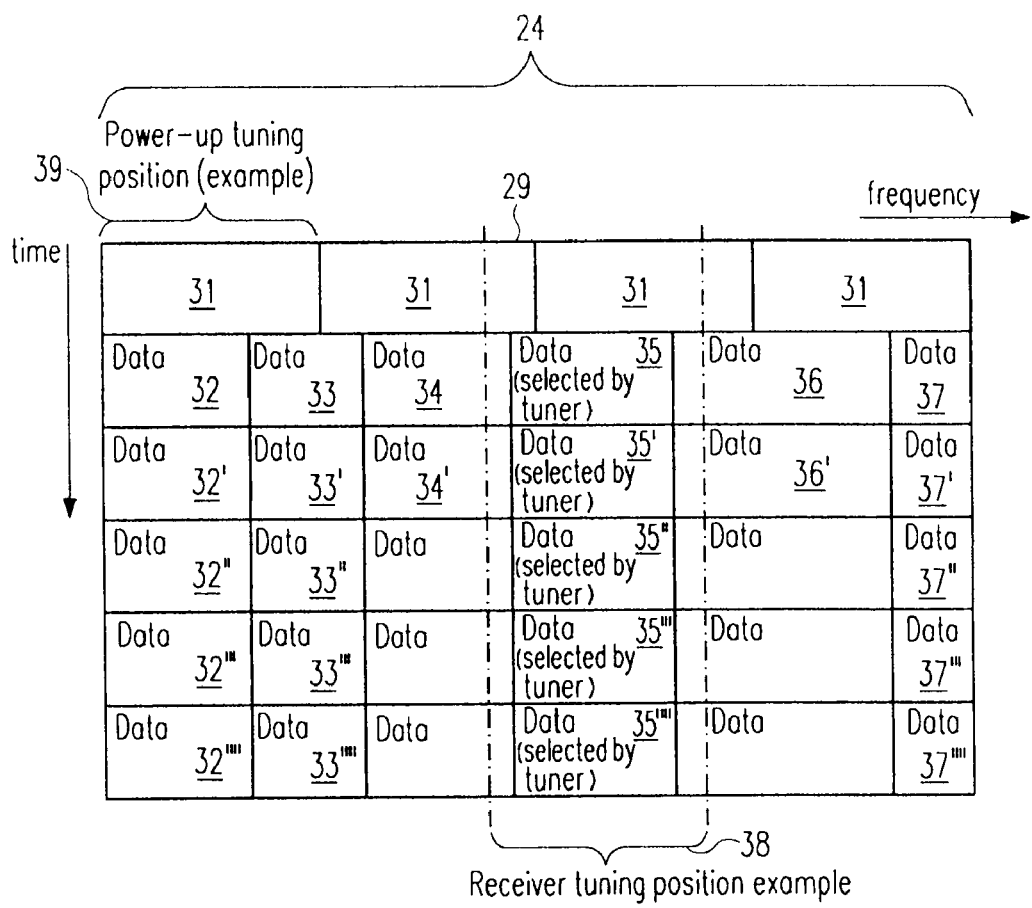

The present invention further relates to a corresponding transmitting method and frame structure, as well as a receiving apparatus and method and a system and a method for transmitting and receiving signals.

18 Claims, 10 Drawing Sheets

U.S. PATENT DOCUMENTS

| | | | |
|---|---|---|---|
| 7,075,949 B2 * | 7/2006 | Okada et al. | 370/510 |
| 7,098,967 B2 * | 8/2006 | Kanno et al. | 348/726 |
| 7,099,270 B2 * | 8/2006 | Yamaguchi | 370/208 |
| 7,233,625 B2 * | 6/2007 | Ma et al. | 375/260 |
| 7,260,055 B2 * | 8/2007 | Wang et al. | 370/208 |
| 7,349,436 B2 * | 3/2008 | Maltsev et al. | 370/471 |
| 7,492,699 B2 * | 2/2009 | Cho | 370/203 |
| 7,508,842 B2 * | 3/2009 | Baum et al. | 370/468 |
| 7,519,123 B1 * | 4/2009 | Larsson et al. | 375/260 |
| 7,639,660 B2 * | 12/2009 | Kim et al. | 370/343 |
| 7,751,304 B2 * | 7/2010 | Ro et al. | 370/203 |
| 7,782,757 B2 * | 8/2010 | Wang et al. | 370/208 |
| 7,792,201 B2 * | 9/2010 | Lee et al. | 375/260 |
| 2003/0043732 A1 * | 3/2003 | Walton et al. | 370/208 |
| 2003/0214927 A1 * | 11/2003 | Atarashi et al. | 370/335 |
| 2004/0013084 A1 * | 1/2004 | Thomas et al. | 370/210 |
| 2004/0180635 A1 * | 9/2004 | Choi et al. | 455/113 |
| 2006/0013285 A1 * | 1/2006 | Kobayashi et al. | 375/132 |
| 2006/0088112 A1 * | 4/2006 | Das et al. | 375/260 |
| 2006/0128323 A1 * | 6/2006 | Fujimoto | 455/101 |
| 2007/0041311 A1 * | 2/2007 | Baum et al. | 370/208 |
| 2007/0268975 A1 * | 11/2007 | Yoon et al. | 375/260 |
| 2007/0297323 A1 * | 12/2007 | Seki | 370/208 |
| 2008/0043858 A1 * | 2/2008 | Lim et al. | 375/260 |
| 2008/0084940 A1 * | 4/2008 | Hou | 375/260 |
| 2008/0095255 A1 * | 4/2008 | Tanaka et al. | 375/260 |
| 2008/0107011 A1 * | 5/2008 | Yang | 370/203 |
| 2008/0144757 A1 * | 6/2008 | Ishii | 375/362 |
| 2008/0159436 A1 * | 7/2008 | Cho et al. | 375/299 |
| 2009/0052427 A1 * | 2/2009 | Oketani et al. | 370/347 |
| 2009/0109948 A1 * | 4/2009 | Bauernfeind | 370/343 |
| 2009/0116374 A1 * | 5/2009 | Henriksson et al. | 370/203 |
| 2009/0168909 A1 * | 7/2009 | Stadelmeier et al. | 375/260 |
| 2009/0175370 A1 * | 7/2009 | Kuroda et al. | 375/260 |
| 2009/0268829 A1 * | 10/2009 | Kwan et al. | 375/260 |
| 2009/0285137 A1 * | 11/2009 | Fujita et al. | 370/310 |
| 2009/0296839 A1 * | 12/2009 | Stadelmeier et al. | 375/260 |
| 2009/0296843 A1 * | 12/2009 | Gu et al. | 375/262 |
| 2009/0304023 A1 | 12/2009 | Stadelmeier et al. | |
| 2009/0304099 A1 * | 12/2009 | Waller et al. | 375/260 |
| 2010/0034219 A1 * | 2/2010 | Stadelmeier et al. | 370/478 |
| 2010/0135316 A1 * | 6/2010 | Atungsiri et al. | 370/436 |

FOREIGN PATENT DOCUMENTS

| | | |
|---|---|---|
| EP | 1650921 A2 * | 4/2006 |

OTHER PUBLICATIONS

U.S. Appl. No. 12/689,401, filed Jan. 19, 2010, Robert, et al.

Digital Video Broadcasting (DVB); "Second Generation Framing Structure, Channel Coding and Modulation Systems for Broadcasting, Interactive Services, News Gathering and Other Broadband Satellite Applications (DVB-S2)", ETSI EN 302 307 (V1.2.1), European Standard (Telecommunications Series), Aug. 2009, 78 pages.

Digital Video Broadcasting (DVB); "Frame Structure Channel Coding and Modulation for a Second Generation Digital Terrestrial Television Broadcasting System (DVB-T2)", ETSI EN 302 755 (V1.1.1), European Standard (Telecommunications Series), Sep. 2009, 167 pages.

Digital Video Broadcasting (DVB); "Framing Structure, Channel Coding and Modulation for Digital Terrestrial Television", ETSI EN 300 744 (V1.5.1), European Standard (Telecommunications Series), Nov. 2004, 64 pages.

"Data Over Cable Service Interface Specifications DOCSIS 3.0", Physical Layer Specification CM-SP-PHYv3.0-I08-090121, Jan. 21, 2009, 169 pages.

"Transmission System for Digital Terrestrial Television Broadcasting", ARIB Standard, ARIB STD-B31 Version 1.6, Association of Radio Industries and Businesses, Nov. 30, 2005, 172 pages.

Michael Speth, et al., "Optimum Receiver Design for OFDM-Based Broadband Transmission—Part II: A Case Study", IEEE Transactions on Communications, vol. 49, No. 4, Apr. 2001, pp. 571-578.

Stefan H. Müller-Weinfurtner, "OFDM for Wireless Communications: Nyquist Windowing, Peak-Power Reduction, and Synchronization", 2000, ISBN 3-8265-7658-6,117 pages.

U.S. Appl. No. 12/545,205, Aug. 21, 2009, Stadelmeier, et al.

U.S. Appl. No. 12/436,980, May 7, 2009, Stadelmeier, et al.

\* cited by examiner

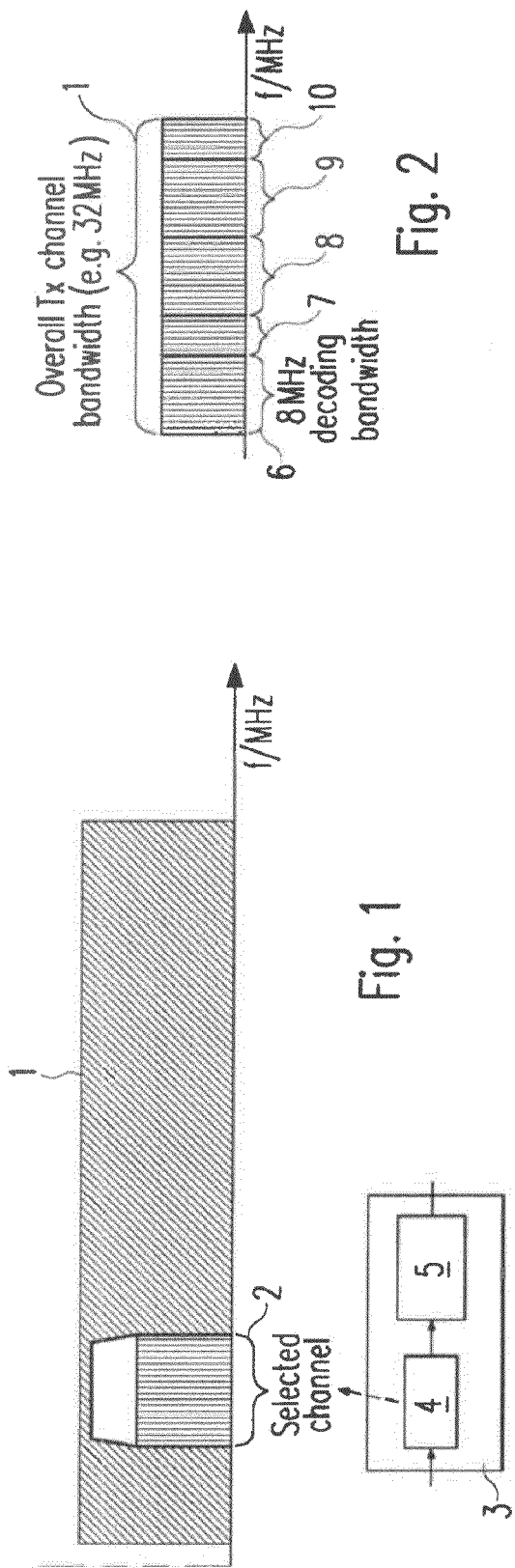

FRAME AND DATA PATTERN STRUCTURE FOR MULTI-CARRIER SYSTEMS

The present invention is directed to a new frame and data pattern structure for multi-carrier systems.

The present invention is hereby mainly directed (but not limited) to broadcast systems, such as for example cable based or terrestrial digital broadcast systems, in which content data, signalling data, pilot signals and so forth are mapped on to a plurality of frequency carriers, which are then transmitted in a given overall or complete transmission bandwidth. The receiver typically tunes to a partial channel (part of the overall transmission bandwidth) out of the complete channel bandwidth (sometimes called segmented reception) in order to receive only the content data which are necessary or wanted by the respective receiver. For example, in the ISDB-T standard, the overall channel bandwidth is hereby divided into 13 fixed segments of an equal length (equal number of frequency carriers).

The object of the present invention is to provide a transmitting apparatus and method, as well as a signal structure for a multi-carrier system, which allow a flexible tuning to any required part of the transmission bandwidth and which has a low overhead.

The above object is achieved by a transmitting apparatus according to claim 1. The transmitting apparatus of the present invention is adapted to transmit signals in a multicarrier system on the basis of a frame structure, each frame comprising at least one signalling pattern and one or more data patterns, said transmitting apparatus comprising frame forming means adapted to arrange first signalling data in said at least one signalling pattern in a frame and adapted to arrange data in said one or more data patterns in a frame, whereby the data of said one or more data patterns are arranged in data frames, each data frame comprising second signalling data and content data, transforming means adapted to transform said at least one signalling pattern and said one or more data patterns from the frequency domain into the time domain in order to generate a time domain transmission signal, and transmitting means adapted to transmit said time domain transmission signal.

The above object is further achieved by a transmitting method according to claim 7. The transmitting method according to the present invention is adapted to transmit signals in a multicarrier system on the basis of a frame structure, each frame comprising at least one signalling pattern in one or more data patterns, and comprises the steps of arranging signalling data in said at least one signalling pattern in a frame, arranging data in said one or more data patterns in a frame, whereby the data of said one or more data patterns are arranged in data frames, each data frame comprise second signalling data and content data, transforming said at least one signalling pattern and said one or more data patterns from the frequency domain into the time domain in order to generate a time domain transmission signal, and transmitting said time domain transmission signal.

The above object is further achieved by a frame pattern for a multicarrier system according to claim 8, comprising at least one signalling pattern and one or more data patterns, wherein data are arranged in said one or more data patterns in a frame, whereby the data of said one or more data patterns are arranged in data frames, each data frame comprising second signalling data and content data.

The object of the present invention is further to provide a receiving apparatus and method, as well as a transmitting and receiving system and method, which allow a flexible tuning to any required part of the transmission bandwidth and which has a low overhead.

The above object is achieved by a receiving apparatus for receiving signals in a multi carrier system on the basis of a frame structure in a transmission bandwidth, according to claim 9, each frame comprising at least one signalling pattern comprising first signalling data and one or more data patterns, whereby the data of said one or more data patterns are arranged in data frames, each data frame comprising second signalling data and content data, said receiving apparatus comprising receiving means adapted to be tuned to and to receive a selected part of said transmission bandwidth, said selected part of said transmission bandwidth covering at least one data pattern to be received, evaluation means adapted to evaluate said second signalling data comprised in a received data frame, and data de-mapping means adapted to de-map data from frequency carriers of a received data frame on the basis of the result of said evaluation.

The above object is further achieved by a receiving method for receiving signals in a multi carrier system on the basis of a frame structure in a transmission bandwidth, according to claim 14, each frame comprising at least one signalling pattern comprising first signalling data and one or more data patterns, whereby the data of said one or more data patterns are arranged in data frames, each data frame comprising second signalling data and content data, comprising the steps of receiving a selected part of said transmission bandwidth, said selected part of said transmission bandwidth covering at least one data pattern to be received, evaluating said second signalling data comprised in a received data frame, and de-mapping data from frequency carriers of a received data frame on the basis of the result of said evaluation.

The above object is further achieved by a system for transmitting and receiving signals, according to claim 15, comprising a transmitting apparatus for transmitting signals in a multi carrier system on the basis of a frame structure, each frame comprising at least one signalling pattern and one or more data patterns, said transmitting apparatus comprising frame forming means adapted to arrange first signalling data in said at least one signalling pattern in a frame, and adapted to arrange data in said one or more data patterns in a frame, whereby the data of said one or more data patterns are arranged in data frames, each data frame comprising second signalling data and content data, transforming means adapted to transform said at least one signalling pattern and said one or more data patterns from the frequency domain into the time domain in order to generate a time domain transmission signal, and transmitting means adapted to transmit said time domain transmission signal, said system further comprising a receiving apparatus according to present invention adapted to receive said time domain transmission signal from said transmitting apparatus.

The above object is further achieved by a method for transmitting and receiving signals, according to claim 16, comprising a transmitting method for transmitting signals in a multi carrier system on the basis of a frame structure, each frame comprising at least one signalling pattern and one or more data patterns, comprising the steps of arranging signalling data in said at least one signalling pattern in a frame, arranging data in said one or more data patterns in a frame, whereby the data of said one or more data patterns are arranged in data frames, each data frame comprising second signalling data and content data, transforming said at least one signalling pattern and said one or more data patterns from the frequency domain into the time domain in order to generate a time domain transmission signal, and transmitting said time domain transmission signal, said method further comprising a receiving method according to the present invention adapted to receive said time domain transmission signal.

Advantageous features are defined in the dependent claims.

The present invention therefore suggests a multi-carrier system which uses a frame structure or frame pattern in the frequency domain. In the frequency domain, each frame comprises at least one signalling pattern, which carries first signalling data on frequency carriers. The at least one signalling pattern may have additional pilot signals on frequency carriers. Alternatively, each frame could have a dedicated training sequence or pattern which is arranged before (in time) the at least one signalling pattern, whereby the training sequence or pattern carries exclusively pilot signals. In this case, the at least one signalling pattern does not need (but can have) pilot signals. Further, each frame comprises one or more data patterns which follow the at least one signalling pattern in time in each frame pattern. Further, according to the present invention, each of the one or more data patterns of a frame in a frequency domain may comprise at least one pilot signal arranged among said data of the data pattern. The at least one pilot signal in each data pattern enables the receiving side to perform a channel estimation for the frequency carriers carrying the data in the data patterns, in a simple way since the location of the pilot signal in the time/frequency grid of the frequency domain is known to the receiver.

The present invention suggests to arrange the data in the one or more data patterns in data frames, wherein each data frame comprises content data and second signalling data. Thus, the present invention suggests to split the arrangement and thus the transmission and reception of the signalling data into the first signalling data which are transmitted in the at least one signalling pattern in a frame, and the second signalling data which are arranged in the data frames. Hereby, it is possible to transmit respectively identical first signalling data in each of the at least one signalling patterns. In other words, if several signalling patterns are provided in a frame, each of the signalling patterns may carry the identical first signalling data. These signalling data are then signalling data which are valid for the entire frame. The second signalling data, on the other hand, contain signalling data which are only valid for the respective data frame. Thus, modulation, coding as well as other parameters of a data frame could be individually signalled with the second signalling data. The present invention therefore suggests a system which is very flexible but still effective in view of the signalling overhead.

During the conversion from the frequency into the time domain, the mapping of the first signalling data (as well as eventually the pilot signals) of the one or more signalling patterns as well as the mapping of the content data and second pilot signals (as well as eventually the pilot signals) of the data patterns onto the frequency carriers takes place. This conversion is e.g. implemented in an Inverse Fourier transformation means or any other suitable transformation means. In the resulting time domain signal, each frame then comprises a respective signalling symbol (eventually preceded by a training symbol) as well as one or more data symbols. Each frame pattern covers the entire or overall transmission band in the frequency direction. The receiving apparatus can be freely, flexibly and quickly tuned to any wanted part of the transmission bandwidth, provided that the part of the transmission bandwidth to which the receiving apparatus can be tuned has at least the length of one of the signalling patterns. Hereby, the receiving apparatus is always able to receive the first signalling data of an entire signalling pattern, so that on the basis and using the first signalling data comprising the physical layer information necessary for the receipt of the succeeding data patterns, the data patterns can be received in the receiving apparatus. In case that each signalling pattern not only comprises first signalling data, but also pilot signals, it is not necessary to provide dedicated preambles or training patterns consisting only of pilot signals, since the pilot signals comprised in the signalling pattern allow the necessary frequency offset detection and compensation in the receiving apparatus, so that the overall overhead is reduced. However, it is also possible to provide dedicated preambles for training patterns with pilot signals which precede the signalling patterns, which in this case do not comprise pilot signals. The present invention is particularly advantageous in systems having a rather high signal-to-noise ratio, such as but not limited to cable based systems. Although the receiver can be flexibly tuned to any wanted part of the transmission bandwidth, it is always possible to receive the first signalling data and the other data (content data) due to the new frame structures suggested by the present invention. Further, the new frame structure enables a fast tuning of the receiving apparatus to the wanted part of the transmission bandwidth. Since the content data are transmitted in data frames, wherein each data frame comprises content data as well as second signalling data, the receiving apparatus is able to receive the content data in a very flexible manner, since the second signalling data comprised in each data frame enable an individual signalling of the parameters of each data frame.

Advantageously, the second signalling data comprise the modulation of the data in the received data frame, whereby the evaluation means of the receiving apparatus is adapted to obtain the modulation and said data de-mapping means is adapted to perform a demodulation of the content data from frequency carriers of the received data frame on the basis of the obtained modulation. Further advantageously, the second signalling data comprise the error coding of the content data in the received data frame, whereby the evaluation means of the receiving apparatus is adapted to obtain the error coding and forward the error coding to an error decoding means adapted to perform an error decoding on the content data of the received data frame.

Further advantageously, the second signalling data comprise connection identification and said evaluation means of the receiving apparatus is adapted to obtain said connection identification. The connection identification is for example information about broadcast, unicast, point-to-point communication and the like and enables the receiving apparatus to identify if the content data in the data frame are intended to be received by the receiving apparatus or not.

Further advantageously, the receiving apparatus comprises a correlation means adapted to perform a correlation on a synchronization sequence comprised in the second signalling data of a received data frame, whereby the data de-mapping means of the receiving apparatus is adapted to de-map said content data from frequency carriers of the received data frame on the basis of the result of the correlation.

Advantageously, the second signalling data in each data frame are arranged in a header of the data frame. Further advantageously, the second signalling data comprise a synchronization sequence. The synchronization sequence could for example be a pseudo-noise sequence, a PRBS (pseudo random binary sequence) or any other suitable sequence. Hereby, advantageously, the second signalling data are arranged in symbols and a part of said synchronization sequence is inserted in each symbol. Hereby, the most significant bit of each symbol could comprise said part of said synchronization sequence. Also, other bits of each symbol could be used for the transmission of said part of said synchronization sequence. Alternatively, the second signalling data are arranged in symbols and a part of said synchronization sequence is modulated onto at least a part of each symbol. For example, one bit of each symbol could have one part (e.g. one bit) of the synchronization sequence modulated onto it.

Thus, using the synchronization sequence, which could for example be a pseudo-noise sequence or any other suitable sequence enabling a correct correlation in the receiving apparatus, the receiving apparatus is able to find the second signalling data within a data frame, to evaluate the content of the second signalling data and then to decode, demodulate and so forth the content data comprised in the respective data frame. This is particularly necessary in (further advantageous) cases in which the at least one of said data patterns in a frame is followed by at least one additional data pattern in the time dimension having the same frequency structure (location within a frame as well as number of frequency carriers) as at least one of said data patterns, wherein data frames arranged in said at least one of said data patterns and the at least one additional data pattern are arranged succeeding each other independent of the frequency structure. In other words, the data frames are arranged within the data patterns, but with a structure which is not limited to and independent of the structure of the data patterns. Thus, in case of a frame which comprises a number of data patterns which succeed each other in the time dimension, having the same frequency structure (in other words are aligned to each other), the data frames comprising the data content and the second signalling data are arranged within these data patterns succeeding each other in a free and flexible manner. Hereby, the length of each data frame as well as the parameters of the data frame, such as error coding, modulation and so forth, can be flexibly set and used for each data frame, e.g. can be different for each data frame or at least some data frames. The respective parameter information for each individual data frame is then contained in the second signalling data, so that the content data in the data frame can be properly received, decoded, demodulated and so forth in the receiving apparatus. Further, the second signalling data could contain connection identification information, i.e. information enabling a receiving apparatus to identify if the transmitted content data in the respective data frame is meant to be received by the receiving apparatus. Thus, broadcast transmission, unicast transmission, point-to-point transmission and so forth is supported by the present invention. Using the synchronization sequence contained in the second signalling data in each data frame, the receiving apparatus is able to find the second signalling data within a data frame, to evaluate the content of the second signalling data and then to decode, demodulate and so forth the content data comprised in the respective data frame. In order to avoid any errors and mistakes, it has to be ensured that the second signalling data in each data frame are encoded with a robust error coding scheme as well as a robust modulation.

Advantageously, the at least one data pattern depends on a minimum data pattern length (in the frequency direction), namely is equal to one or a multiple of a minimum data pattern length. Thus, in case that two or more or a plurality of data patterns is provided in a frame, the data patterns could have different lengths. However, the length of the data patterns depends on the minimum data pattern length as stated. Therefore, although the length of the data patterns is or may be variable, the overhead is reduced, i.e. the amount of first signalling data which need to be transmitted from a transmitter side to a receiving side is reduced as compared to a system in which the data pattern length is completely variable and can be set to any desired value. Since each data pattern is equal to one or a multiple of the minimum data pattern length, the overall transmission bandwidth may be a multiple of the minimum data pattern length.

Advantageously each frame comprises at least one signalling pattern having first signalling data arranged on frequency carriers, said first signalling data comprising the length of each of said one or more data patterns in reference to (or in terms of) said minimum data pattern length, said receiving apparatus further comprising evaluation means adapted to extract said length from received first signalling data. Further advantageously the number of pilot signals in each received data pattern is directly proportional to the number of minimum data patterns lengths comprised in said received data pattern, wherein said channel estimation means of said receiving apparatus is adapted to perform a channel estimation on the basis of said pilot signals. Thus, since a specific and fixed number of pilot signals is allocated to and comprised in the minimum data pattern length, for example one pilot signal, two pilot signals, three pilot signals or suitable number of pilot signals, each data pattern has a resulting number of pilot signals mapped onto its frequency carriers.

Further advantageously, the pilot signals are arranged in the one or more data patterns with a pilot signal pattern, wherein said minimum data pattern length depends on the density of said pilot signals in the pilot pattern. Hereby, the term pilot signal pattern is intended to characterize a certain structure and arrangement of pilot signals in the time/frequency grid of a frame (in the frequency domain), whereby the entire pilot signal pattern or at least some parts of it comprise pilot signals arranged in a regular pattern in the time and/or the frequency direction. Advantageously, the minimum data pattern length depends on the density of the pilot signals in the pilot pattern. Hereby, the lower the pilot signal density is, the larger the minimum data pattern length can be and vice versa. Therefore, in a system, in which less pilot signals (a lower density of pilot signals) are necessary in order to achieve a reliable channel estimation on the receiver side, the minimum data pattern length can be larger as compared to systems in which a higher pilot signal density is needed. Advantageously, the pilot signals in the pilot signal pattern have a regular spacing in the frequency direction, whereby the minimum data pattern length corresponds to the spacing between two adjacent pilot signals in a frequency direction. Hereby, it is ensured that each data pattern only comprises a single pilot signal. Of course, it is also possible that the minimum data pattern length could be chosen so that two or more pilot signals are comprised in each data pattern. Further advantageously, each data pattern has the same length in the time direction. While the data pattern length could (but not necessarily must be) variable in the time direction, this advantageous option suggests to provide each data pattern with the same length in the time direction (also called time domain). Hereby, the length of the data patterns in the time direction may advantageously correspond to the spacing between two adjacent pilot signals in the time direction.

Further advantageously a time de-interleaving means is provided in said receiving apparatus which is adapted to perform a block wise time de-interleaving on received data patterns with a block length corresponding to a multiple of the data pattern length in the time direction As explained above, under one option of the present invention, the frame structure of the present invention may comprise signalling patterns having pilot signals. Hereby, advantageously, the frame structure comprises at least two signalling patterns adjacent to each other in the frequency direction and at least one data pattern following the signalling patterns in the time direction, whereby first signalling data and pilots are arranged in said at least two signalling patterns in the frame, each signalling pattern having the same length. Advantageously, said pilot signals arranged in said at least two signalling patterns in a frame form a pilot signal sequence. In other words, all pilot signals of a frame form a pilot signal sequence. Alternatively, said pilot signals in each one of said at least two signalling patterns advantageously form a pilot signal sequence, wherein the pilot signal sequences are different from each other. Advantageously, said pilot signal sequence is a pseudo random binary sequence. Advantageously, said frame forming means is adapted to arrange said pilot signals on frequency carriers of said at least two signalling patterns with a differential modulation scheme. Advantageously, a pilot signal is mapped onto every m-th frequency carrier of said at least two signalling patterns, m being an integer >1. Advantageously, each of said at least two signalling patterns comprises at least one pilot band and said pilot signals are mapped onto frequency carriers of said at least one pilot band.

Further advantageously, as already mentioned, each frame comprises at least one additional data pattern succeeding said one or more data patterns in the time dimension (i.e. direction), each of said additional data patterns having the respective same length as the corresponding one of said previous data patterns. In other words, the structure of the data pattern(s) in each frame is advantageously set up in a way that the one or more data patterns are arranged in the frequency dimension so that the entire transmission bandwidth is covered. At least one additional data pattern is then arranged in the same frame but following the at least one data pattern in the time direction, whereby each additional or following data pattern has the same length (in the frequency dimension or direction) as the previous data pattern in the same frequency position. Thus, if a receiving apparatus is tuned to a specific part of the transmission bandwidth, several data patterns per frame can be received, whereby said several data patterns have the same length (in the frequency dimension) and follow each other in the time dimension.

In the frequency dimension, the length of each of the data patterns transmitted by the transmitting apparatus could be fix (permanent) or could be adjusted dynamically. Alternatively or additionally, the number of additional data patterns in the time dimension could be adjusted dynamically. Also, the length of the data patterns in one frame in the time direction, i.e. the length of the time slots could be fixed or could be varying. Hereby it is important that the signalling patterns of the next frame all start at the same time point. Any dynamic changes in respect to the data patterns will then be signalled in the signalling patterns. The multi-carrier system with the frame structure as suggested by the present invention thus enables a very flexible transmission of data content in which the length of data patterns, and thus the amount of data per data pattern can be dynamically changed, for example from frame to frame or in any other required way. Alternatively, the length and/or the number of the data patterns may be fixed or permanent.

It has to be understood that the present invention can be applied to any kind of multi-carrier system in which a transmitting apparatus is adapted to transmit data in an entire transmission bandwidth and a receiving apparatus is adapted to selectively receive only a part of said entire transmission bandwidth. Non limiting examples for such systems may be existing or future uni-directional or bi-directional broadcast systems, such as wired or wireless (for example cable based, terrestrial etc.) digital video broadcast systems. The non limiting example for a multi-carrier system would be an orthogonal frequency division multiplex (OFDM) system, however, any other suitable system could be used in which data, pilot signals and the like are mapped on a plurality of frequency carriers. The frequency carriers may hereby be equidistant and respectively have the same length (bandwidth). However, the present invention may also be used in multi-carrier systems in which the frequency carriers are not equidistant and/or do not have the respectively same length. Further, it should be understood that the present invention is not limited to any kind of specific frequency range neither in the overall transmission bandwidth applied on the transmitting side nor on the selected part of the transmission bandwidth to which the receiving side is tuned. However, in some applications it might be advantageous to use a receiving bandwidth on the receiving side, i.e. a bandwidth for the part of the transmission bandwidth to which the receiver can be tuned, which corresponds to the bandwidth of receiving devices of existing (digital video broadcast or other) systems. A non limiting example for a receiver bandwidth may be 8 MHz, i.e. the receiving side can be tuned to any wanted 8 MHz bandwidth from the overall transmission bandwidth. Hereby, the overall transmission bandwidth could be a multiple of 8 MHz, for example 8 MHz, 16 MHz, 24 MHz, 32 MHz, 64 MHz, 256 MHz etc, so that the segmentation of the overall transmission bandwidth, i.e. length of each signalling pattern could be 8 MHz. However, other segmentations are possible, e.g. (but not limited to) a length of each signalling pattern of 4 MHz or 6 MHz.

Generally, in case of the non limiting example of 8 MHz for the receiver bandwidth, the length of each of the signalling patterns used in the frame structure of the present invention could be 8 MHz, 6 MHz, 4 MHz (or less).

Figure 5:
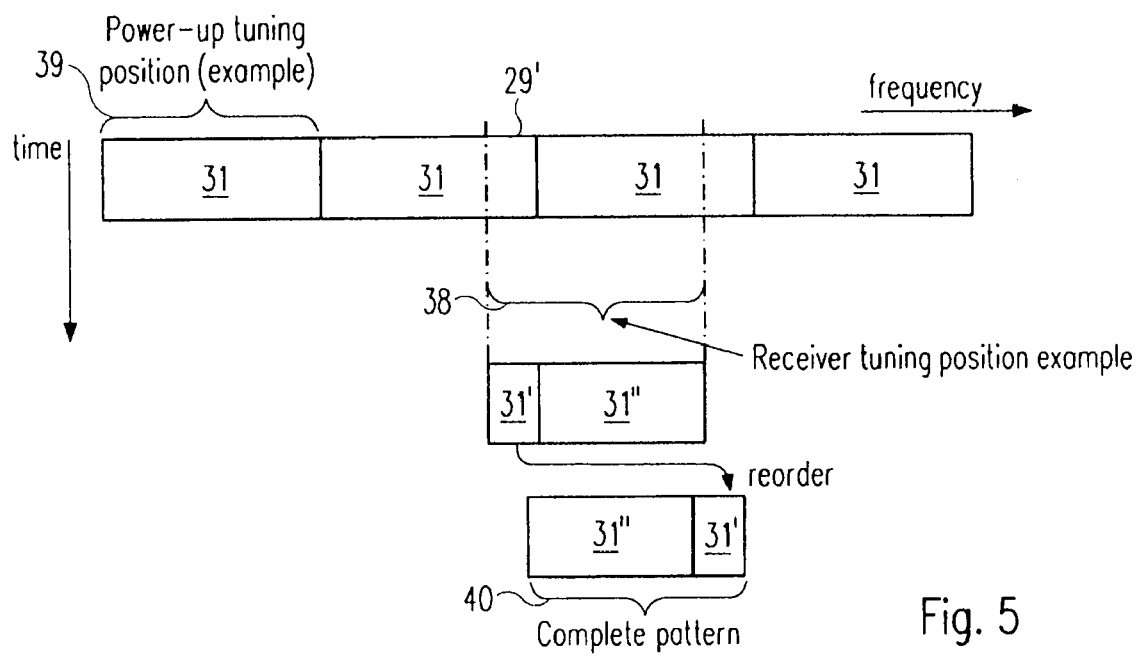
Figure 6:
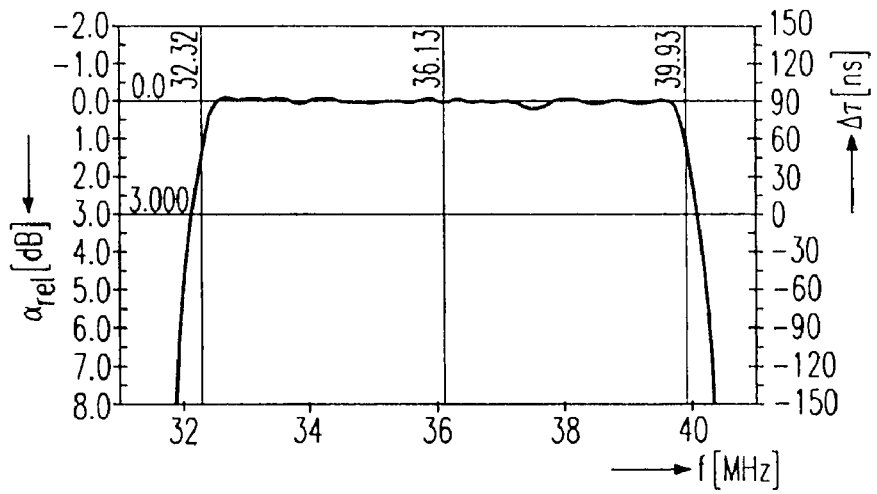
Figure 7:
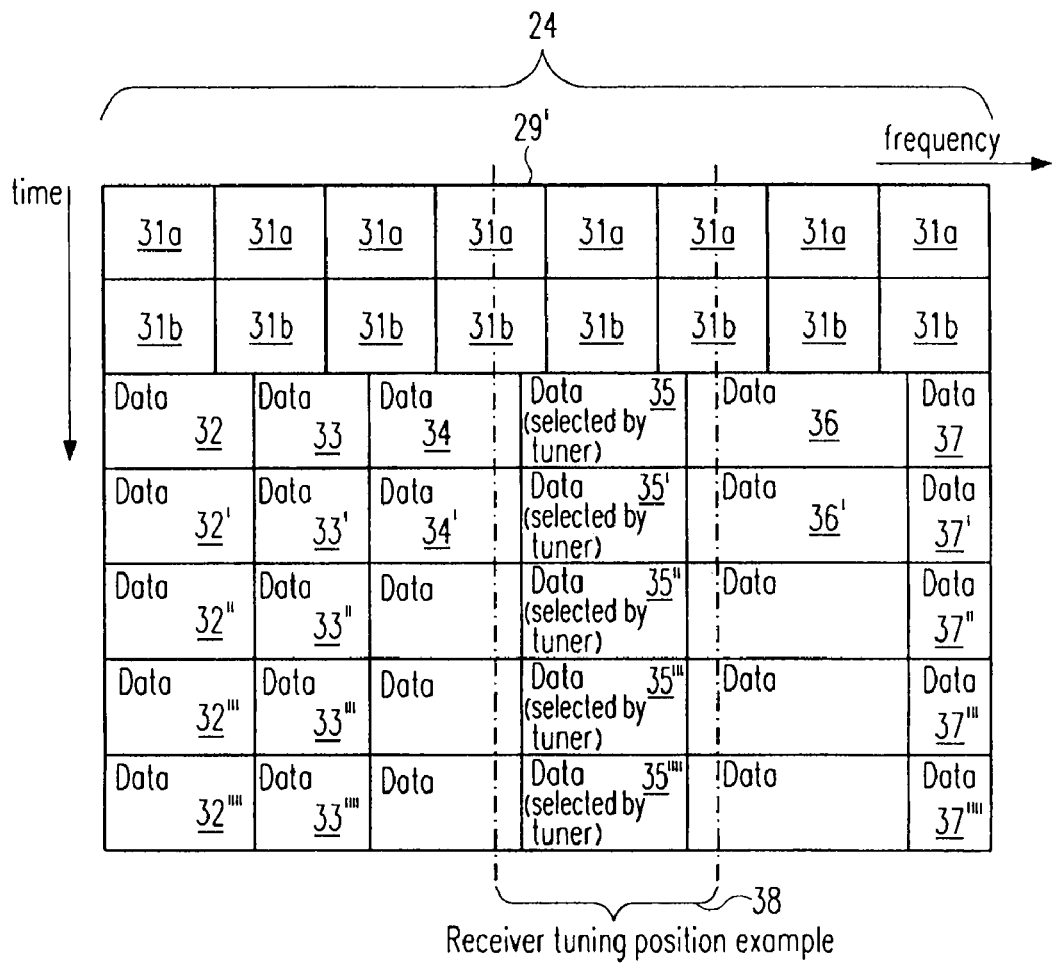
Figure 8:
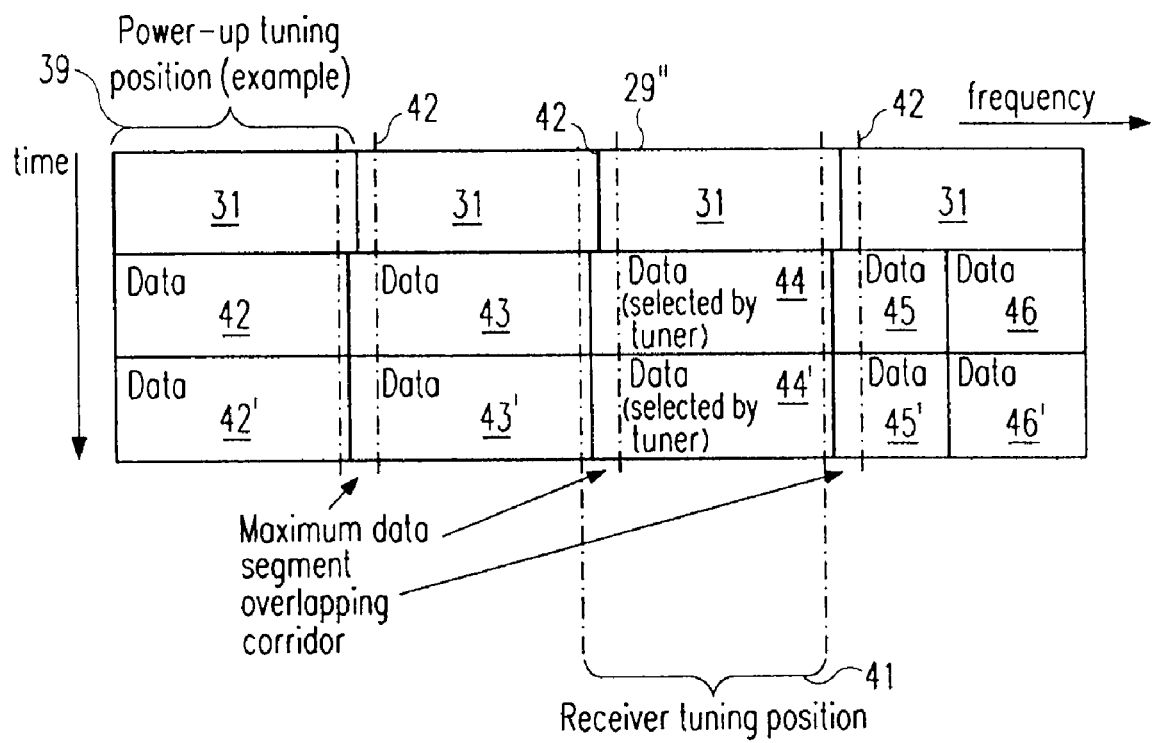
Figure 9:
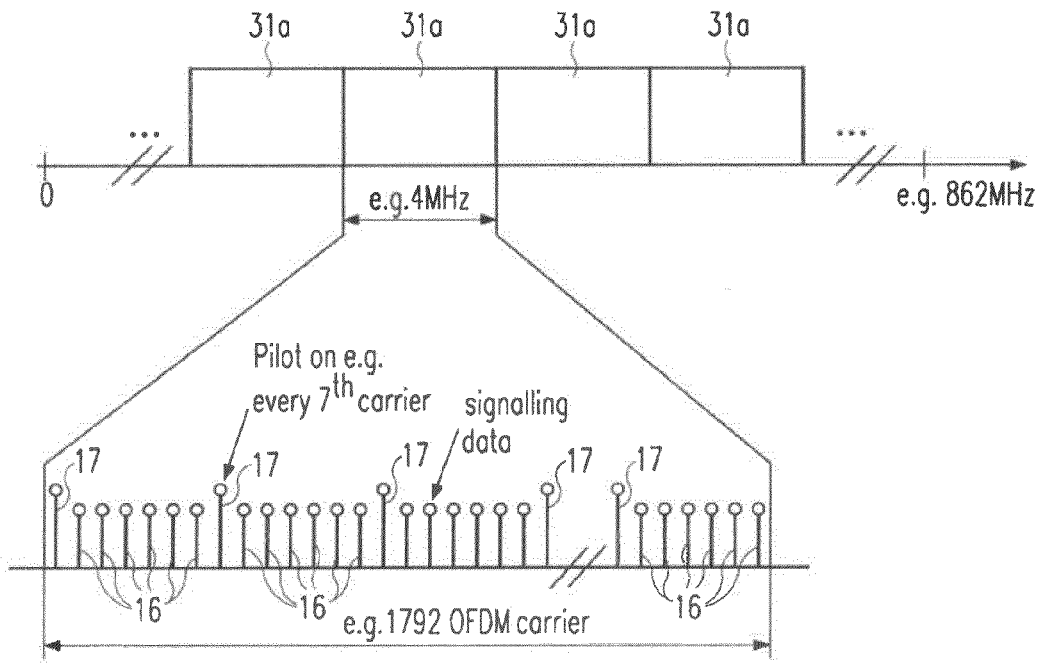
Figure 10:
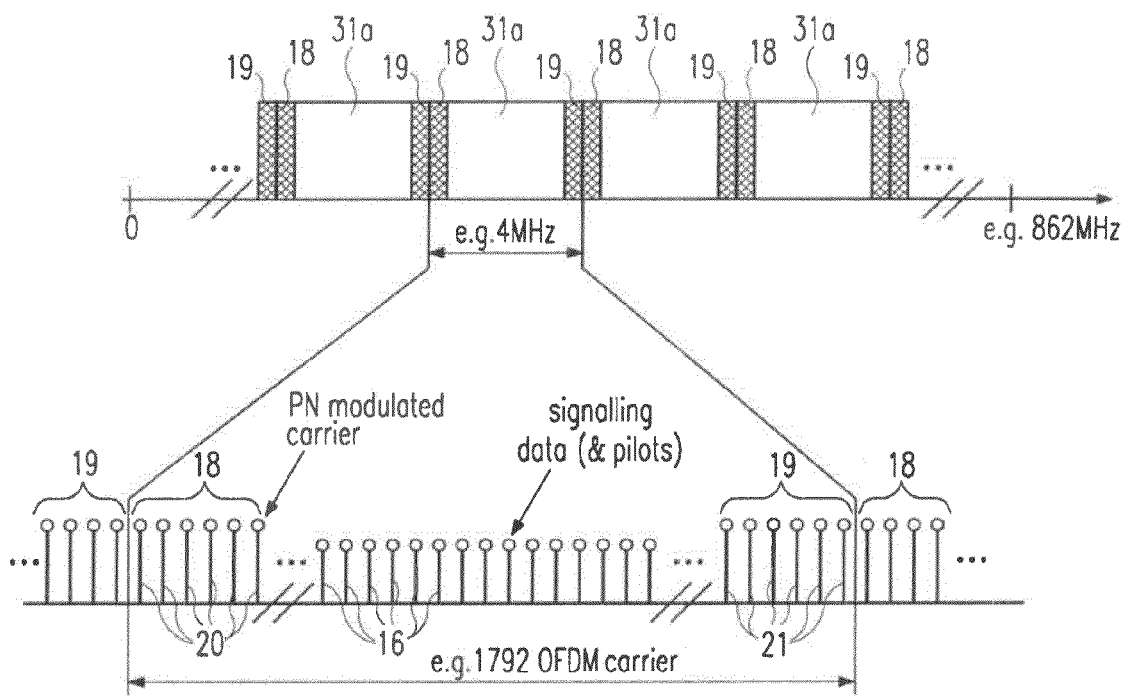
Figure 11:
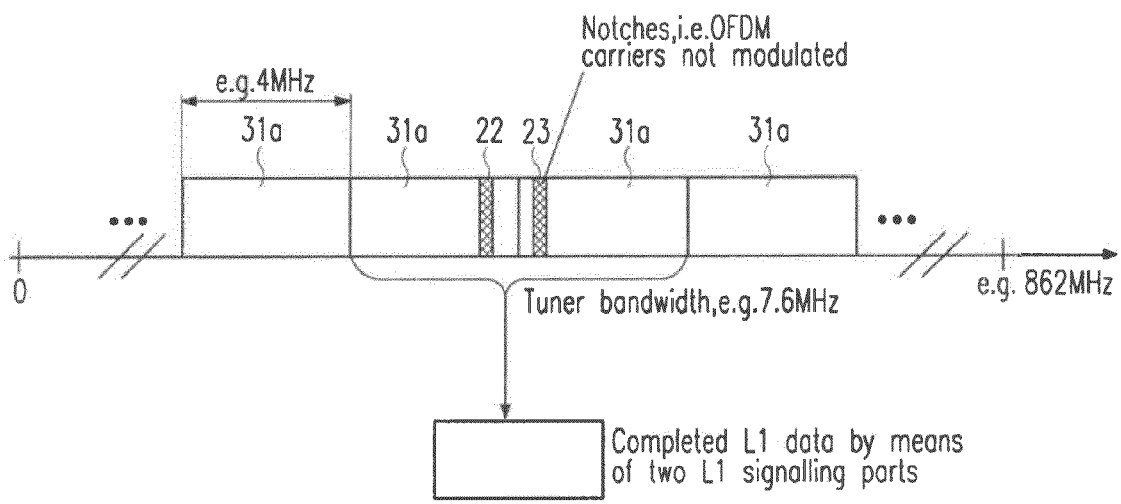
Figure 12:
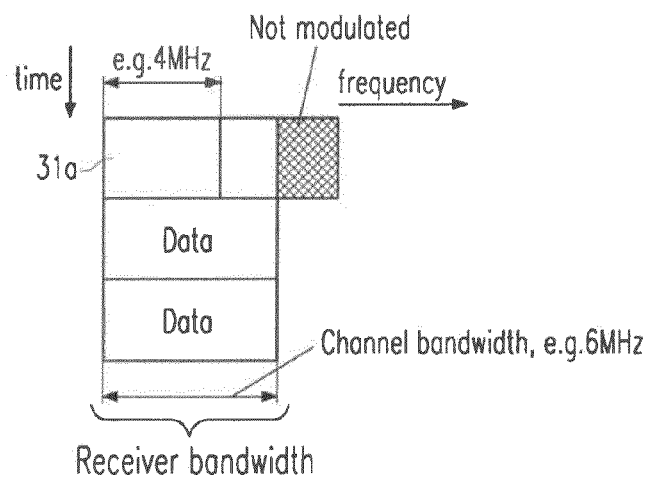
Figure 13:
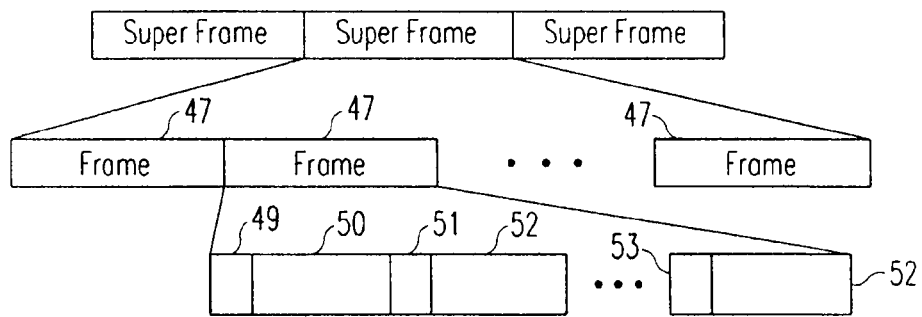
Figure 14:
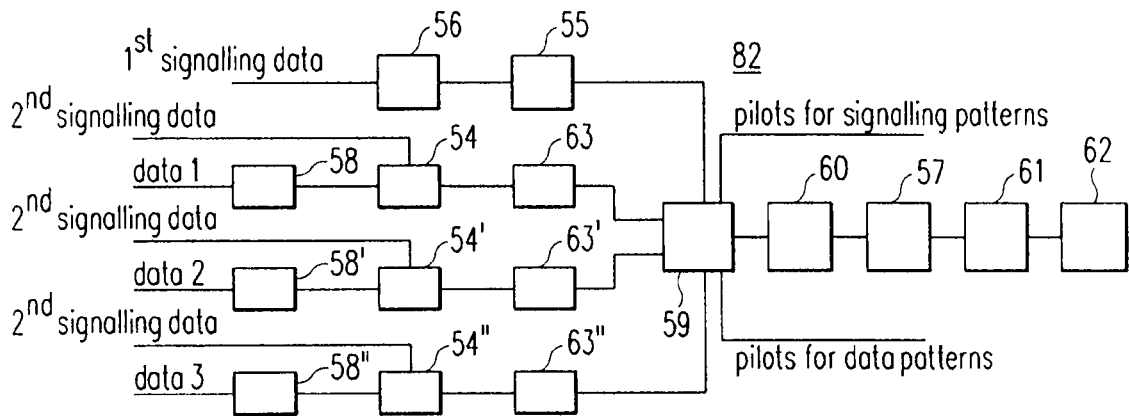
Figure 15:
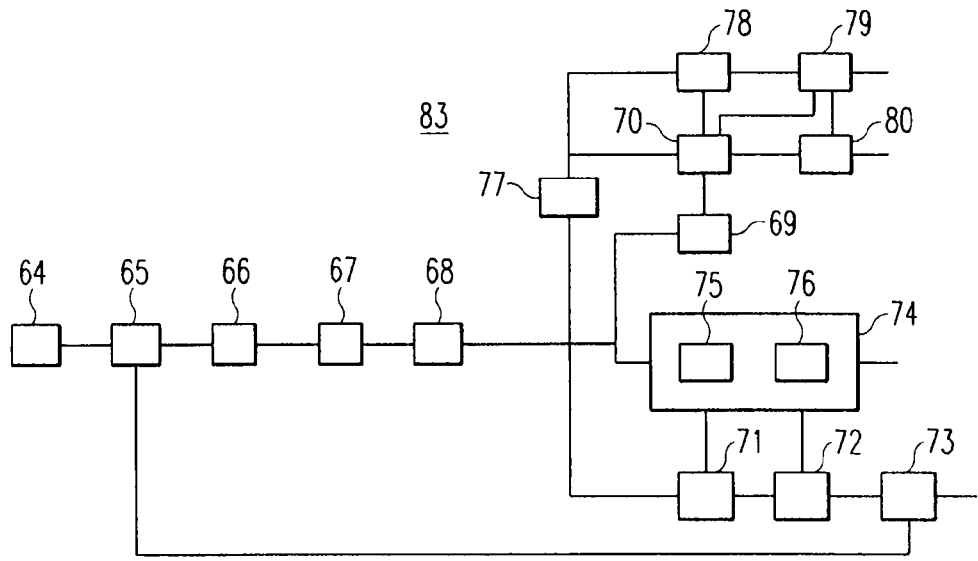
Figure 16:
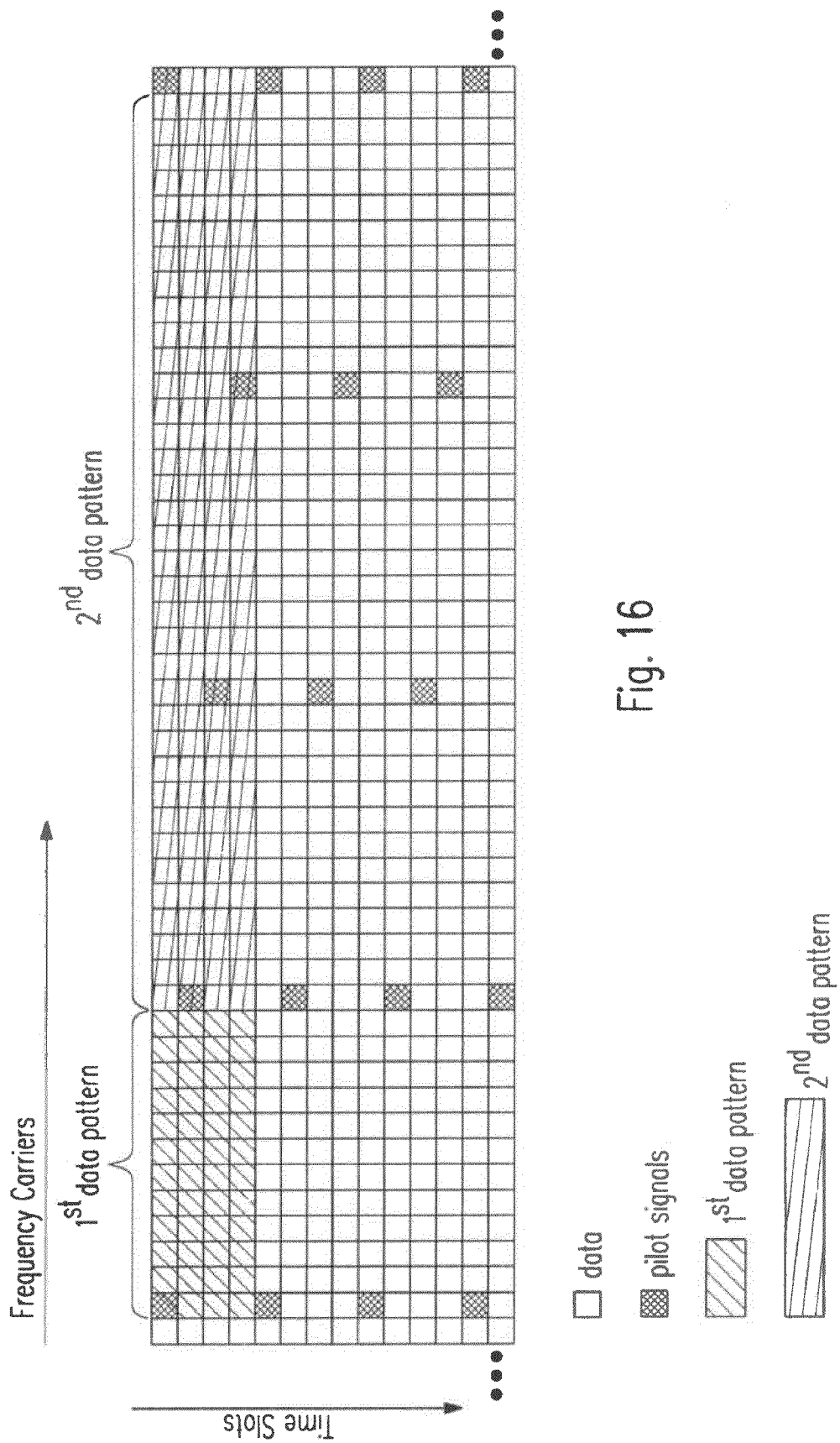
Figure 17:
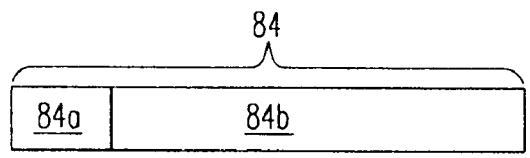
Figure 18:
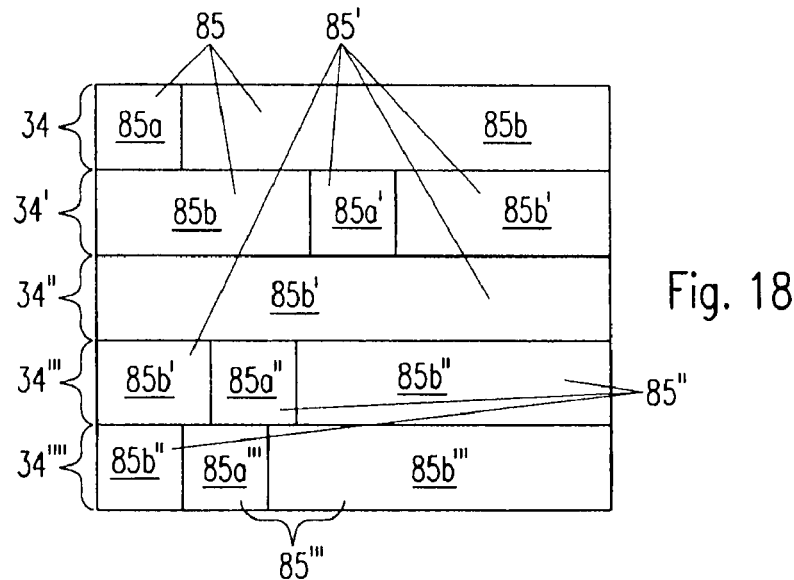
Figure 19:
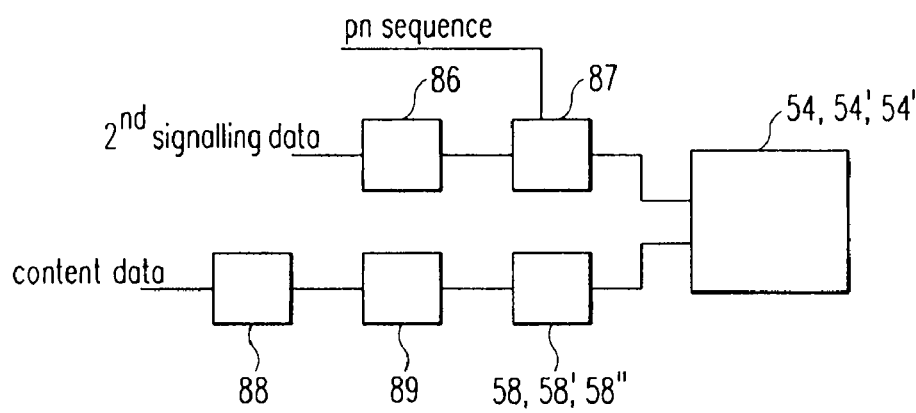
Figure 20:
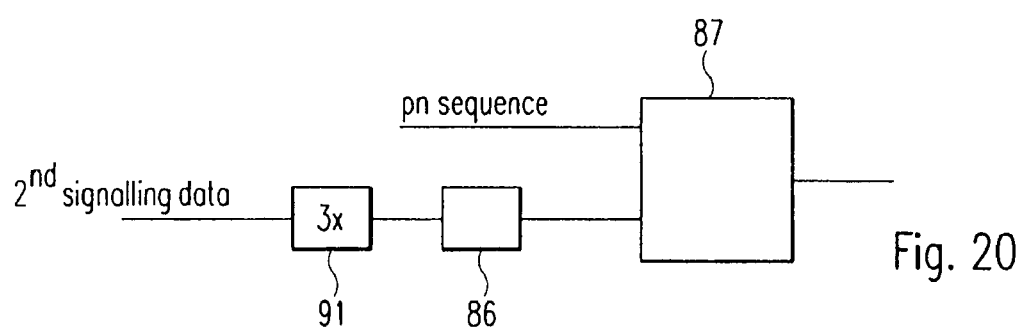
Figure 21:
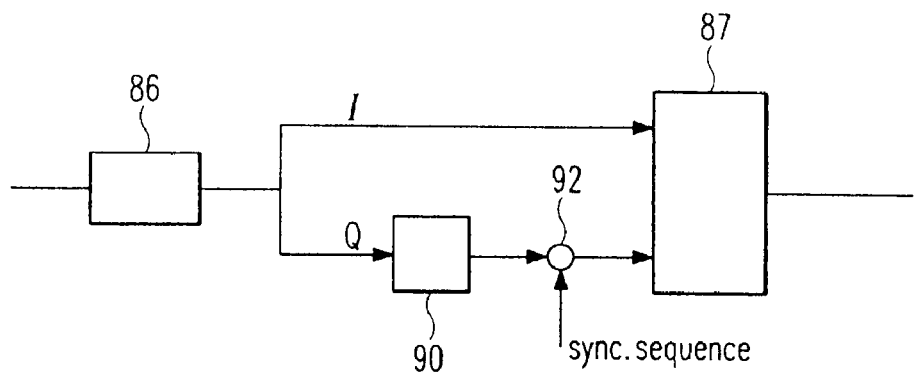
Figure 22:
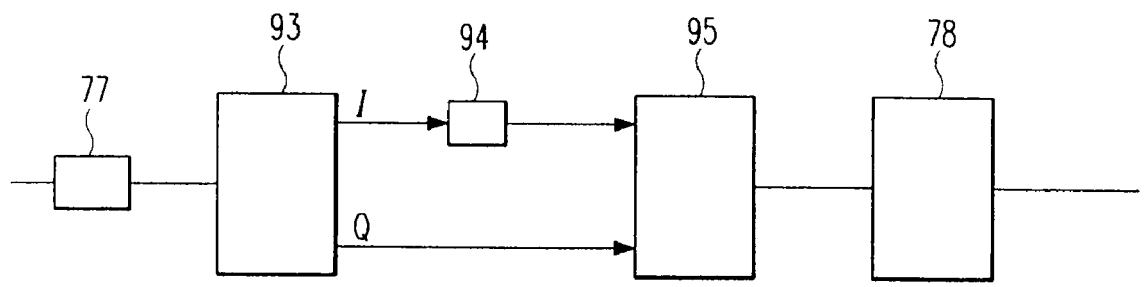
Figure 23:
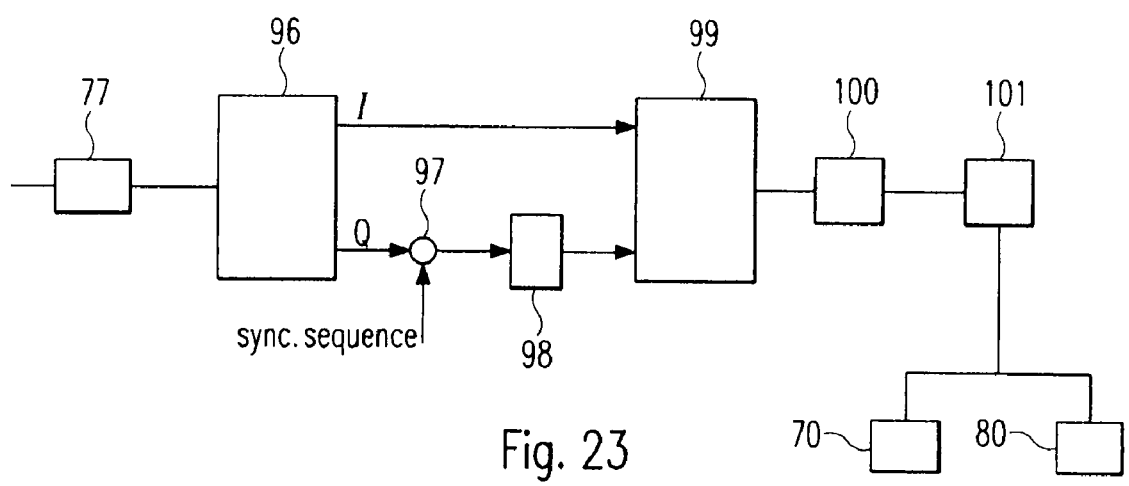

The present invention is explained in more detail in the following description of preferred embodiments in relation to the enclosed drawings, in which FIG. 1 shows a schematic diagram of an entire transmission bandwidth from which a selected part can be selectively and flexibly received by a receiver, FIG. 2 shows an example for a segmentation of the overall transmission bandwidth, FIG. 3 shows a schematic time domain representation of a frame structure according to the present invention, FIG. 4 shows a schematic example of a frame structure or pattern according to the present invention, FIG. 5 shows a part of the frame structure of FIG. 4 with an explanation of a reconstruction of a signalling pattern, FIG. 6 shows a schematic example of a receiver filter characteristic, FIG. 7 shows a further example of a frame structure of pattern according to the present invention, FIG. 8 shows a part of a further example of a frame structure or pattern according to the present invention, FIG. 9 shows a first example of an allocation of pilot signals to a signalling pattern, FIG. 10 shows a second example of an allocation of pilot signals to a signalling pattern, FIG. 11 shows a further example of a reconstruction of a signalling pattern, FIG. 12 shows an example of the adaptation to different channel bandwidths, FIG. 13 schematically shows an example of a frame structure of the present invention in the time dimension, FIG. 14 shows a schematic block diagram of an example of a transmitting apparatus according to the present invention, FIG. 15 shows a schematic block diagram of an example of a receiving apparatus according to the present invention, FIG. 16 shows a schematic representation of a part of a frame structure according to the present invention, FIG. 17 shows a schematic representation of a data frame according to the present invention, FIG. 18 shows a schematic representation of several data patterns having the same frequency structure and being arranged immediately succeeding each other in the time dimension, FIG. 19 shows a schematic representation of a part of the transmitting apparatus shown in FIG. 14, in which the data frames according to the present invention are formed, FIG. 20 shows a first implementation example of a part of the transmitting apparatus according to the present invention in which the headers of the data frames of the present invention are formed, FIG. 21 shows a second implementation example to form headers of the data frames of the present invention, FIG. 22 shows an implementation example of a part of the receiving apparatus according to the present invention to detect a synchronization peak from the data frame headers, and FIG. 23 shows an implementation example of a part of the receiving apparatus according to the present invention to obtain the second signalling data.

FIG. 1 shows a schematic representation of an entire transmission bandwidth 1, in which a transmitting apparatus according to the present invention, as for example the transmitting apparatus 82 schematically shown in FIG. 14, transmits signals in a multi-carrier system in line with the present invention. FIG. 1 further schematically shows a block diagram of a receiving apparatus 3 of the present invention, which is adapted to be tuned to and selectively receive a selected part 2 of the transmission bandwidth 1. Hereby, the receiving apparatus 3 comprises a tuner 4 which is adapted to be tuned to and selectively receive the wanted part 2 of the transmission bandwidth 1 as well as further processing means 5 which perform the further necessary processing of the received signals in line with the respective communication system, such as a demodulation, channel decoding and the like. A more elaborate example of a receiving apparatus according to the present invention is shown in the schematic block diagram of FIG. 15, which shows a receiving apparatus 83 comprising a receiving interface 64, which can for example be an antenna, an antenna pattern, a wired or cable-based receiving interface or any other suitable interface adapted to receive signals in the respective transmission system or communication system. The receiving interface 64 of the receiving apparatus 83 is connected to a receiving means 65 which comprises a tuning means, such as the tuning means 4 shown in FIG. 1 as well as further necessary processing elements depending on the respective transmission or communication system, such as down conversion means adapted to down convert the received signal to an intermediate frequency or the base band.

As stated above, the present invention enables a flexible and changing reception of a wanted part 2 of the transmission bandwidth 1 in a receiver by providing a specific and new frame structure for a multi-carrier system. FIG. 2 shows a schematic representation of an overall transmission bandwidth 1, within which a transmitting apparatus 82 (FIG. 14) of the present invention is adapted to transmit data content, such as video data, audio data or any other kind of data, in different segments or parts 6, 7, 8, 9 and 10. For example, the parts 6, 7, 8, 9 and 10 could be used by the transmitting apparatus 82 to transmit different kinds of data, data from different sources, data intended for different recipients and so forth. The parts 6 and 9 have for example a maximum bandwidth, i.e. the maximum bandwidth which can be received by a corresponding receiving apparatus 83. The parts 7, 8 and 10 have smaller bandwidths. It is now suggested to apply a frame structure or pattern to the entire transmission bandwidth 1 whereby each frame comprises at least two signalling patterns adjacent to each other in the frequency direction and a number of data patterns. Each signalling pattern has the same length and comprises first signalling data as well as pilot signal mapped onto its frequency carriers (frequency subcarriers in the case of an OFDM system). In other words, the overall transmission bandwidth 1 is divided into equal parts for the signalling patterns, whereby the maximum bandwidth to which a receiver can be tuned, for example the bandwidth shown for parts 6 and 9 in FIG. 2, has to be equal or larger than the length of each signalling pattern. The new frame structure may therefore only comprise signalling patterns and data patterns, but not any separate training patterns or other patterns in which pilot signals are comprised. In other words, the present invention suggests a new frame structure with a preamble which only consists of two or more signalling patterns, and with data patterns following the preamble in the time direction. Alternatively, the signalling patterns could not have pilot signals, but could be preceded by training patterns with pilot signals.

It should be noted that the length of the various data parts in the transmission bandwidth cannot exceed the length (number of frequency carriers) of the maximum bandwidth to which a receiver can be tuned as will be explained in more detail further below.

FIG. 3 shows a schematic representation of an example of a time domain structure of frames 11, 12 according to the present invention. Each frame 11, 12 comprises one or more signalling symbols 13, 13' and several data symbols 14, 14'. Hereby, in the time domain, the signalling symbols are preceding the data symbols. Each frame 11, 12 may have a plurality of data symbols, wherein systems are possible in which the number of data symbols in each frame 11, 12 varies. The pilots signals comprised in the signalling symbols are used in a receiving apparatus 83 to perform channel estimation and/or integer frequency offset calculation. The time synchronization can e.g. be done by performing a guard interval correlation (or any other suitable technique) on guard intervals of received signalling symbols and/or data symbols in the time domain. The signalling symbols 13, 13' further contain signalling information (first signalling data), for example all physical layer information that is needed by the receiving apparatus 83 to decode the received signals, such as but not limited to L1 signalling data. The first signalling data may for example comprise the allocation of data content to the various data patterns, i.e. for example which services, data streams, modulation, error correction settings etc. are located on which frequency carriers, so that the receiving apparatus 83 can obtain information to which part of the entire transmission bandwidth it shall be tuned. It is possible that all signalling patterns in a frame contain the identical first signalling data. However, each signalling patterns may additionally contain signalling data indicating the offset or distance of the respective signalling pattern from the beginning of a frame so that the receiving apparatus 83 may optimize the tuning to the wanted part of the transmission frequency in a way that the receipt of the signalling patterns and the data patterns is optimized. On the other hand, the offset or distance of the respective signalling pattern from the beginning of a frame can also be encoded in pilot signals, in pilot signal sequences or in guard bands allocated to or comprised in the signalling patterns, so that every signalling pattern in one frame can have the identical signalling data. The use of the frame structure according to the present invention has the further advantage that by dividing the data stream into logical blocks, changes of the frame structure can be signalled from frame to frame, whereby a preceding frame signals the changed frame structure of the or one of the succeeding frames. For example, the frame structure allows a seamless change of modulation parameters without creating errors.

FIG. 4 shows a schematic example of a frequency domain representation of a frame structure or pattern 29 according to the present invention. The frame structure 29 covers the entire transmission bandwidth 24 in the frequency direction and comprises at least two signalling patterns 31 adjacent to each other in the frequency direction, each carrying the identical or almost identical first signalling data mapped on respective frequency carriers and having the same length. In the example shown in FIG. 4, the (first time slot of) entire transmission bandwidth 24 is sub-divided into four signalling patterns 31, but any other higher or lower number of signalling patterns might be suitable. In the transmitting apparatus 82 of the present invention as shown in FIG. 14, a frame forming means 59 is adapted to arrange the first signalling data (obtained from a modulating means 55) as well pilot signals (supplied from a suitable source within the transmitting apparatus 82) in each signalling pattern. The signalling patterns are beforehand modulated by the modulating means 55 with a suitable modulation scheme, e.g. a QAM modulation or any other. Advantageously, a pseudo noise sequence or a CAZAC sequence is used for the pilot signals, but any other pilot signal sequence with good pseudo noise and/or correlation properties might be suitable. Each signalling pattern of a frame might comprise a different pilot signal sequence, but alternatively, the pilot signals of the signalling pattern of one frame might form a single pilot signal sequence.

It should be understood that the frame forming means 59 can be implemented as a single module, unit or the like, or can be implemented as or in several modules, units, devices and so forth. Further, it should be understood, that the frame forming means 59 may not form an entire frame structure or pattern 29 as shown in FIG. 4 (or frame structure or pattern 29' as shown in FIG. 7) at one time point, but may be adapted to form one part of the frame structure 29 (or 29') after another in the time dimension (i.e. time slot after time slot). For example, the frame forming means 59 could be adapted to first arrange the signalling patterns 31 as shown in FIG. 4 adjacent to each other as well as to add the pilot signals as described above and below over the entire width of the transmission bandwidth 24 (i.e. in the example shown in FIG. 4, or for signalling patterns 31). Then, this part of the frame 24 (the first time slot) could be further processed, for example by transforming it from the frequency domain into the time domain, by building a resulting time domain symbol (for example an OFDM symbol) and so forth. Then, in the next step, the frame forming means 59 could be adapted to process the line of data patterns 32, 33, 34, 35, 36, 37 (i.e. the next time slot) in the manner which will be described further below over the entire transmission bandwidth 24, where after these data patterns are further processed for example by transforming them from the frequency domain into the time domain, by forming a time domain symbol (for example an OFDM symbol) and so forth. Thus, in the representation of FIG. 4, the frame structure 29 could be formed by the frame forming means 59 line wise or time slot wise, each part of the frame structure 29 which extends over the entire transmission bandwidth 24 in the frequency direction will be formed and processed as one block but the parts succeeding each other in the time direction (time slots) will be formed and processed one after the other.

The frame forming means 59 might be adapted to arrange said pilot signal so that a pilot signal will be mapped onto every m-th frequency carrier 17 (m being a natural number larger than 1) in each signalling pattern, so that the frequency carriers 16 in between the pilots carry the first signalling data, as will be explained in more detail in relation to FIG. 9 below. Additionally or alternatively, the frame forming means 59 may be adapted to arrange pilot signals so that pilot signals will be mapped onto frequency carriers 20, 21 of at least one pilot band 18, 19 comprised in a signalling pattern, as will be explained in more detail in relation to FIG. 10 below. A pilot band 18, 19 consists of a number of immediately adjacent frequency carriers, onto which pilot signals are mapped. Hereby, each signalling pattern may have a single pilot band 18 or may have two pilot bands 18, 19, one at the beginning and one at the end of the signalling pattern in the frequency direction. The length of the pilot bands (number of frequency carriers allocated to a pilot band) is advantageously the same for each signalling pattern. The length or bandwidth 39 of every signalling pattern 30 may be the same as the bandwidth 38 to which the tuner of the receiving apparatus 83 can be tuned. However, the part of the transmission bandwidth to which the tuner of the receiving apparatus 83 can be tuned, may be larger than the length of a signalling pattern 30. All the statements made above and below in relation to the pilot signals comprised in the signalling patterns also apply to the pilot signals comprised in the data pattern, as explained below, e.g. in relation to FIG. 16.

The received pilots, i.e. pilot signals mapped on every m-th frequency carrier and/or comprised in pilot bands of a received signalling pattern, (after transformation into the frequency domain in the time to frequency transformation means 68, which is e.g. a Fourier transformation means) are used for a channel estimation of the frequency carriers in the frame in a channel estimation means 69, which provides a de-mapping means 70 with the necessary channel estimation information enabling a correct de-mapping (i.e. demodulation) of the signalling data in the received signalling patterns. Also, the received pilots are used in the receiving apparatus 83 for an integer frequency offset detection in a corresponding integer frequency offset detection means 67 which enables a detection and then a compensation of the integer frequency offset of the received signals. The integer frequency offset is the deviation from the original (transmitted) frequency in multiples of the frequency carrier spacing.

Each signalling pattern 31 may comprise the location of the signalling pattern 31 within the frame. For example each signalling pattern 31 in each frame 29 has and carries the identical first signalling data and additionally the location of the respective signalling pattern in the frame, which is different in each signalling pattern 31 in a frame. The signalling data are for example L1 signalling data which contain all physical layer information that is needed by the receiving apparatus 83 to decode received signals. However, any other suitable signalling data may be comprised in the signalling patterns 31. The signalling patterns 31 might for example comprise the location of the respective data segments 32, 33, 34, 35, 36 so that a receiving apparatus 83 knows where the wanted data segments are located so that the tuner of the receiving apparatus 83 can tune to the respective location in order to receive the wanted data segments. Alternatively, as stated above, each signalling pattern of a frame might comprise the identical first signalling data, and the location of the respective signalling pattern within a frame is signalled (if at all) in a different way, e.g. by means of the pilot signal sequence of the signalling patterns or by means of information encoded in guard bands or the like. As stated above, each of the signalling patterns 31 could comprise information about each of the data patterns comprised in a frame. This information could include the data pattern length, the number and/or the location of the pilot signals comprised in the data patterns. Hereby, the information on the length of the data patterns is e.g. expressed in terms of or referring to the minimum data pattern lengths. However, in order to reduce the overhead, each signalling pattern 31 could comprise information about only a part or some of the data patterns, for example but not limited to the ones which are located within (or located within and adjacent to) the frequency band in which the signalling pattern 31 is located. In the example of FIG. 4, the first signalling pattern 31 in the frame could comprise information about the data patterns 32 and 33 (and the time wise following data patterns 32', 32" . . . 33', 33" etc). The second signalling pattern in the frame could comprise information about the data patterns 33, 34 and 35 (and the time wise following data patterns 33', 33" . . . 34', 34" . . . 35', 35" etc).

In addition to the dedicated signalling patterns 31 as explained above, the frame structure also comprises additional second signalling data embedded or comprised in the data patterns. According to the present invention, the content data in the data patterns are arranged in data frames, wherein each data frame comprises a second signalling pattern and content data. For example, each column of data patterns (i.e. data patterns having the same frequency structure and succeeding each other in the time direction), e.g. 33, 33', 33", 33''', 33'''', could contain data frames with content data and second signalling data indicating the modulation used for content data in the respective data frame, their error coding and/or connection identification information enabling the receiving apparatus to determine if the data is intended to be received or not. This reduces the implementation complexity in the receiver as well as guarantees short delays for interactive services. This possibility applies to all embodiments of the present invention and will be explained in more detail in relation to the FIGS. 17 to 20.

As shown in FIG. 15, the receiving apparatus 83, after the receiving means 65 with the tuner, comprises a time synchronization means 66 adapted to perform time synchronization and a fractional frequency offset detection means 67 adapted to perform fractional frequency offset detection and compensation on the received time domain symbols. The received time domain symbols are then supplied to a time to frequency transformation means 68 for transforming the received time domain signals into the frequency domain, where after the first signalling data (after an optional reconstruction in a reconstruction means 71), are de-modulated in a de-mapping means 72 and then evaluated in an evaluation means 73. The evaluation means 73 is adapted to extract the necessary and required signalling information from the received first signalling data. If necessary, additional signalling patterns could be provided in the time direction immediately succeeding the signalling patterns 31.

The frame structure or pattern 29 further comprises at least one data pattern or segment extending over the entire or a part of the frequency bandwidth 24 in the frequency direction and following the signalling patterns 31 in the time direction. In the time slot immediately following the time slot in which the signalling patterns 31 are located, the frame structure 29 shown in FIG. 4 comprises several data segments 32, 33, 34, 35, 36 and 37 with different lengths, i.e. a different number of respective frequency carriers onto which data are mapped. The frame structure 29 further comprises additional data segments in succeeding time slots, whereby the additional data patterns respectively have the same length and number of frequency carriers as the respectively preceding data pattern. For example, the data pattern 32', 32", 32''' and 32'''' have the same length as the first data pattern 32. The data patterns 33', 33", 33''' and 33'''' have the same length as the data segment 33. In other words, the additional data patterns have the same frequency dimension structure as the several data patterns 32, 33, 34, 35, 36 and 37 in the first time slot after the signalling patterns 31. Thus, if the receiving apparatus 83 for example tunes to a part 38 of the transmission bandwidth in order to receive the data pattern 35, all time wise succeeding data patterns 35', 35" and 35''' which have the same length as the data pattern 35 can be properly received. As mentioned above, the frame forming means 59 may form the respective lines of data patterns extending over the entire transmission bandwidth 24 one after the other (time slot by time slot). For example, the data patterns 32, 33, 34, 35, 36, 37 will be formed by the frame forming means 59, and then transformed from the frequency domain into the time domain. Afterwards, the data patterns 32', 33', 34', 35', 36', 37' will be formed by the frame forming means 59 and then transformed from the frequency domain into the time domain. Afterwards, the data patterns 32", 33", 34", 35", 36", 37" will be formed by the frame forming means 59 and then transformed from the frequency domain into the time domain and so forth. The transformation from the frequency to the time domain will be done by a separate means, for example the frequency to time transformation means 60 as described.

As mentioned earlier, the length of the one or more data patterns, e.g. the data patterns shown in the frame structures of FIG. 4 and FIG. 7, comprised in a frame structure according to the present invention each comprise at least one pilot signal, whereby the length of each of the one or more data patterns is equal to or a multiple of a minimum data pattern length. The minimum data pattern length can for example be set in a way that at least one pilot signal is comprised in each data pattern of a frame. Alternatively two, three, four, five or any other suitable number of pilot signals could be comprised in one minimum data pattern length. Hereby, in some implementations it might be advantageous to choose rather small data pattern lengths in order to have a higher flexibility in the allocation of the data patterns for the transmission of content data. Therefore, in some implementations it might be more advantageous to choose a minimum data pattern length so that only a single one or may be two pilot signals are comprised in it. However, other implementations may be possible. Further, in some implementations it might be useful to set the minimum data pattern length depending on the density or number of pilot signals comprised in an entire frame. For example, in case that the pilot signals among the data patterns are chosen so that a good and reliable channel estimation on the receiving side is enabled without loosing too much transmission capacity (by allocating pilot signals to frequency carriers of data patterns instead of data). For example, in systems in which the occurrence of multipath effects or other negative effects necessitate the provision of a rather high number (and resulting density) of pilot signals, the result will normally be that the pilot signals are closer together (in frequency and/or in time direction), so that the minimum data pattern length could be rather short if only a single pilot signal would be comprised in it. On the other hand, in case of systems in which a lower number (and density) of pilot signals is required in order to enable a reliable channel estimation on a receiving side, the frequency and time direction spacing of the pilot signals could be comparatively large, so that the resulting minimum data pattern length could be longer. Normally, in the time domain, guard intervals are provided in between data symbols or the data symbols comprise guard intervals in order to cope with multipath effects or other negative effects. Thus, there can be a correlation between the length of the guard intervals between the data symbols and the density of the pilot signals in the data patterns of a frame. The longer the guard intervals are, the higher the number of the required pilot signals among the data patterns usually is and vice versa. Thus, the pilot signal density and number among the data patterns of a frame could be set depending on the guard interval length, so that the minimum data pattern length could depend on the length of the guard intervals.

The provision of a minimum data pattern length which determines the length of each of the data patterns within a frame reduces the signalling overhead since the length of the data pattern has to be communicated only by reference to the minimum data pattern length from the transmitter to the receiver. On the other hand, the location of the data patterns within a frame is known to the receiver since entire transmission bandwidth is a multiple of the minimum data pattern length. Thus, the frequency alignment, i.e. the frequency location in the time/frequency grid in the frequency domain is always the same for the data patterns and therefore known to the receiver, such as the receiving apparatus 83 as shown and explained in relation to FIG. 15. Further, particularly in case when the pilot signals form a pilot signal pattern with a regular spacing between adjacent pilot signals in the frequency and the time direction, the location of the pilot signals in the time/frequency grid is also known to the receiving apparatus so that they do not need to be signalled either. FIG. 16 shows an example of a pilot signal pattern in a time/frequency grid. Specifically, FIG. 16 shows a part of an entire frequency bandwidth, for example a data part of the frame shown in FIG. 4 or in FIG. 7 with a detailed representation of the frequency carriers in the frequency direction (horizontal direction) and the time slots (vertical direction), each time slot resulting in a data symbol after frequency to time transformation. In the example shown in FIG. 16, the spacing of the pilot signals in the frequency direction is 12, i.e. every $12^{th}$ frequency carrier carries a pilot signal (all other frequency carriers carry data). However, as can be seen in FIG. 16, "adjacent" pilot signals are not adjacent in the same time slot, but in neighbouring or immediately adjacent time slots. This enables a better channel estimation in the receiving apparatus 83 and the time direction. Alternatively, adjacent pilot signals in the frequency direction could be allocated to the same time slot, or could be spaced by one, two or any other suitable number of time slots. In the time direction, adjacent pilot signals are, for example shown in FIG. 16, spaced by 4 time slots, i.e. every $4^{th}$ time slot carries a pilot signal. Hereby, adjacent pilot signals in the shown example are located in the same frequency carrier. Alternatively, "adjacent" pilot signals in the time direction could be located in immediately adjacent frequency carrier, or spaced by 1, 2, 3 or any other suitable number of frequency carriers. Thus case that the minimum data pattern length is set to the spacing between adjacent pilot signals in the frequency direction as well as in the time direction, a single pilot signal would be comprised within the minimum data pattern length, which has 12 frequency carriers in the frequency direction and 4 time slots in the time direction. Thus, the minimum data pattern comprises 48 pilot signals (which correspond to a pilot density of 1/48). In FIG. 16, two examples of possible data patterns are indicated. The first data pattern has a length corresponding to the minimum data pattern length, i.e. comprises 48 frequency carriers, whereas the second data pattern comprises 3 minimum data pattern lengths or sizes, i.e. comprises 144 frequency carriers. Generally, the use of such a pilot pattern having a regular distribution in the time and/or frequency direction or similar pilot pattern ensures that the pilot locations within the data patterns are easier to predict in the receiving apparatus 83.

The receiving apparatus 83 shown in FIG. 15 comprises the channel estimation means 69 which is adapted to perform a channel estimation on the basis of the pilot signals received in data patterns and to provide a de-mapping means 70 with the necessary channel estimation information. The de-mapping means 70 is thus able to de-map or de-modulate the data correctly from the (de-interleaved) frequency carriers on the basis of the channel estimation information.

Further, if every data pattern has the same length in the time direction, this ensures a constant number of data symbols (in the time domain) independent from the tuning position of the receiving apparatus 83. In addition hereto, having the data pattern length being equal to or multiple of a minimum data pattern length, an easier and better predictable adjustment of a time interleavers 63, 63', 63" of the transmitting apparatus 82 and a time de-interleaver 77 comprised in the receiving apparatus 63. The time interleavers 63, 63', 63" are respectively arranged between data frame forming means 54, 54', 54" and the frame forming means 59 and are adapted to perform time interleaving on the data. The time de-interleaver 77 of the receiving apparatus 83 is located after the time to frequency transformation means 68 and before the de-mapping means 70 (as well as before the correlation means 78) and performs time de-interleaving correspondingly. Specifically, the time interleavers 63, 63', 63" and the time de-interleaver 77 could advantageously be realized as block interleavers having a size which depends on the minimum data pattern length in the time direction. Advantageously, the block size is hereby a multiple of the minimum data pattern length, i.e. of the data patterns having the same length, in the time direction (e.g. a multiple of 4 for the example of FIG. 16).

The flexible and variable data pattern structure of the frame structure or pattern 29 as suggested by the present invention can for example be implemented in the transmitting apparatus 82 of the present invention as shown in FIG. 14 by mapping of various different data streams, for example with different kinds of data and/or data from different sources, as visualized by the branches data 1, data 2 and data 3 in FIG. 14. The content data of each branch are modulated according to the implemented modulation scheme, e.g. QAM or any other suitable modulation, in a respective modulating means 58, 58', 58". Respective data frames with the (modulated) content data and second signalling data are formed in respective data frame forming means 54, 54', 54" which form the data frames in the frequency dimension. The second signalling data are already modulated with a suitable modulation, and before the respective modulation, the content data as well as the second signalling data were already encoded by a suitable (error) coding scheme. The respective content data and the second signalling data of the data frames as well as the pilot signals (obtained from a suitable source within the transmitting apparatus 82) are then arranged in the data patterns in the frame forming means 59, e.g. by a data pattern forming means comprised in the frame forming means 59. The frame forming means 59 also forms the signalling patterns with the first signalling data and the pilot signals, e.g. by a signalling pattern forming means comprised in the frame forming means 59. The frame forming means 59 then forms the frames having the frame structures 29, 29' with the signalling patterns and the data patterns as described. As mentioned, the frame forming means 59 could be implemented in one or several modules, or could also be part of other processing units or modules. Further, the frame forming means 59 may be adapted to form a frame 29 at succeeding time periods, for example by first forming the sequence of signalling patterns 31 extending over the entire transmission bandwidth 24, then by forming the sequence of data patterns 32, 33, 34, 35, 36, 37 extending over the entire transmission bandwidth 24 and so forth. The signalling data, content data as well as the respective pilot signals are then (separately and one after another) transformed from the frequency to the time domain and mapped onto frequency carriers in the frequency to time transforming means 60 (which is for example an Inverse Fast Fourier Transformation means or the like). Hereby, it is to be noted that the frame structure 29, 29' forms the basis for the frequency to time transformation. The signalling data, content data as well as pilot signals of each of the time slots (time units in the time dimension of the frame structures 29, 29') of the entire transmission bandwidth 24 are mapped onto the frequency carriers. In other words, all the patterns of the entire transmission bandwidth 24 in each time slot are always mapped onto the necessary number of frequency carriers. For example the first time slot (i.e. all signalling patterns 31) of the frame structure 29 of FIG. 4 would then result in a signalling symbol, the second time slot (i.e. all data patterns 32, 33, 34, 35, 36, 37) of the frame structure would then result in a data symbol and so forth. The correspondingly formed time domain symbols (e.g. OFDM symbols) are then supplied from the frequency to time transforming means 60 to a guard interval adding means 57 which adds guard intervals to the time domain symbols. The thus formed transmission symbols are then transmitted by a transmitting means 61 via a transmitting interface 62

As stated, at least some of the various data patterns may have different lengths, i.e. different numbers of frequency carriers in case that the frequency carriers are equidistant and have the same bandwidth, respectively. Generally, the length of the data patterns in the frequency direction needs to be smaller or at maximum equal to the effective receiver bandwidth so that the data patterns can be received in the receiving apparatus 83. Further, the transmitting apparatus 82 may be adapted to change the data pattern structure, e.g. the length and/or the number of the data patterns (in frequency and/or time direction) dynamically. Alternatively, the structure of the data patterns could be fixed or permanent.

Generally, the frame structure of the present invention could be fixed or permanent, i.e. the overall bandwidth as well as the extension of each frame in the time direction could be fixed and always the same. Alternatively, the frame structure can also be flexible, i.e. the overall bandwidth and/or the extension of each frame in the time direction could be flexible and changed from time to time depending on the desired application. For example, the number of time slots with data patterns could be flexibly changed. Hereby, the changes could be signalled to a receiving apparatus in the signalling data of the signalling patterns.

During the start-up phase or initialization phase of the receiving apparatus 83, the receiving apparatus 83 tunes to an arbitrary frequency part of the overall frequency bandwidth. In the non-limiting example of a cable broadcast system, the signalling pattern 30 could for example have a 8 MHz bandwidth (it has to be understood, however, that the signalling patterns could also have any other bandwidth, such as 4 MHz, 6 MHz etc.). Thus, during the start-up phase, the receiving apparatus 83 is able to receive an entire signalling pattern 30 in the original or re-ordered sequence and to perform a time synchronization in the time synchronization means 66, e.g. by performing a guard interval correlation on the guard intervals of received signalling symbols (or data symbols) or by using any other suitable technique to obtain a time synchronization. The receiving apparatus 83 further comprises the mentioned fractional frequency offset detection means 67 adapted to perform a detection and calculation of the fractional frequency offset of the received signals from fractions of the frequency carrier spacing in order to allow fractional frequency compensation. The thus obtained fractional frequency offset information could then be supplied to the tuner comprised in the receiving means 65 which then performs fractional frequency compensation. The fractional frequency compensation could also be done by other suitable techniques. After transforming the received time domain signals to the frequency domain in the time to frequency transformation means 68 (which is for example a Fast Fourier Transformation means or the like), the pilot signals in the received signalling patterns are used to perform a channel estimation (usually a coarse channel estimation) in the channel estimation means 69 and/or an integer frequency offset calculation. The integer frequency offset calculation is performed in an integer frequency offset detection means 74 which is adapted to detect and calculate the frequency offset of the received signals from the original frequency structure, wherein the frequency offset is counted in integer multiples of the frequency carrier spacing (thus integer frequency offset). The thus obtained integer frequency offset information could then be supplied to the tuner comprised in the receiving means 65 which then performs integer frequency compensation. The integer frequency compensation could also be done by other suitable techniques. Since the fractional frequency offset has already been calculated and compensated by means of the fractional frequency offset detection means 67, the complete frequency offset compensation can therefore be achieved. In the evaluation means 73 of the receiving apparatus 83, the received first signalling data are evaluated, for example the location of the received signalling pattern in the frame is obtained so that the receiver can freely and flexibly tune to the respectively wanted frequency position, such as the part 38 is shown in FIG. 4. However, in order to be able to properly evaluate the first signalling data of the signalling patterns 31 in case that the tuning position of the receiving apparatus 83 does not match with the signalling pattern structure, the received signalling signals have to be re-ordered which is performed in a re-constructing means 71 as described. FIG. 5 shows this reordering in a schematic example. The last part 31' of a previous signalling pattern is received before the first part 31" of a succeeding signalling pattern, where after the reconstructions means 71 places the part 31' after the part 31" in order to reconstruct the original sequence of the signalling data, where after the reordered signalling pattern is evaluated in the evaluation means 73 after a corresponding de-mapping of the first signalling data from the frequency carriers in the de-mapping means 72. It is to be remembered that the content of each signalling pattern 31 is the same, so that this reordering is possible.

Often, a receiving apparatus does not provide a flat frequency response over the complete receiving bandwidth to which the receiver is tuned. In addition, a transmission system usually faces increasing attenuation at the boarder of the receiving bandwidth window. FIG. 6 shows a schematic representation of a typical filter shape example. It can be seen that the filter is not rectangular, so that e.g. instead of 8 MHz bandwidth, the receiving apparatus is only able to effectively receive 7.61 MHz bandwidth. The consequence is that the receiving apparatus 83 may not be able to perform the reordering of the signalling data as described in relation to FIG. 5 in case that the signalling patterns 31 have the same length and bandwidth as the receiving bandwidth of the receiving apparatus 83, so that some signals are lost and cannot be received at the border of the receiving bandwidth. In order to overcome this problem, and other problems and in order to ensure that the receiving apparatus 83 is always able to receive one complete signalling pattern in the original sequence and does not have to reorder or rearrange the received signalling signals, the present invention alternatively or additionally suggests to use signalling patterns 31a which have a reduced length as compared to the receiver bandwidth.

According to the example shown in FIG. 7, it is suggested to use signalling patterns 31a which have half the length of a receiver bandwidth, but still the same frequency structure. In other words, respective two (i.e. pairs) of the half length signalling patterns 31a are matched and aligned with the receiver bandwidth. Hereby, each pair of signalling patterns 31a would have the identical first signalling data or almost identical first signalling data including the (varying) location of the signalling patterns 31a in the respective frame. However, in relation to the other pairs of signalling patterns, in these other pairs, since they have a respective different location within the frame, the signalling data would be identical except the location information. In the above example of the receiving apparatus 83 having a bandwidth or length of 8 MHz, the signalling pattern 31a would then each have a length or bandwidth of 4 MHz. Hereby, in order to ensure that the same amount of first signalling data as before can be transmitted, it might be necessary to add additional half length signalling patterns 31b in the time slot succeeding the signalling patterns 31a and before the data patterns 32, 34, 35, 36 and 37. The additional signalling patterns 31b have the same time and frequency arrangement/alignment as the signalling patterns 31a, but comprise additional and different signalling information as the signalling information contained in the signalling patterns 31a. In this way, the receiving apparatus 83 will be able to receive the signalling patterns 31a and 31b completely and the reconstruction means 71 of the receiving apparatus is adapted to combine the first signalling data of the signalling patterns 31a and 31b to the original sequence. In this case, the reconstruction means 71 in the receiving apparatus 83 can be omitted.

It is also advantageously possible to only provide one time slot with half length signalling patterns 31a if all necessary first signalling data can be transmitted in the half length and the additional signalling patterns 31b are not necessary. In this case, each signalling pattern 31a comprises the identical (or almost identical) first signalling data and each received signalling pattern 31a enables the receiving apparatus 83 to always tune to and receive any wanted part of the transmission bandwidth and thus the wanted data pattern(s). Alternatively, even more half length signalling patterns could be used in the succeeding time slot after the signalling patterns 31b.

It should be generally (for all embodiments of the present invention) noted that the length (or bandwidth) of the data patterns and/or the signalling patterns could be adapted to, e.g. could be smaller than or at maximum equal to, the effective receiving bandwidth of the receiving apparatus 83, for example to the output bandwidth of the receiving band pass filter, as described above.

Further, for all embodiments of the present invention, it could be advantageous if one or more of the signalling patterns 31; 31a, 31b are succeeded in the time direction by one or more additional signalling patterns with the same length and location within the frame. For example, the first signalling pattern in a frame could have one or more additional signalling patterns in the succeeding time slots. The additional signalling patterns could hereby have the identical or almost identical signalling information as the first signalling pattern. Hereby, the other signalling patterns in a frame do not need to have additional signalling patterns. Generally, the number of signalling patterns in each frequency location within a frame could be varying. For example, it could be advantageous if in each frequency location of a frame a number of signalling patterns is provided which is necessary in view of notches or other disturbances. Alternatively or additionally, the number of signalling patterns in each frequency location within a frame could be varying depending on the amount of signalling data. Hereby, for example, if more data patterns need to be signalized, more signalling patterns could be necessary in the time direction. The length of the signalling patterns in the time direction could hereby be part of the first signalling data comprised in the signalling patterns.

In a non-limiting example, the transmission and reception of the first signalling data, e.g. L1 (Level 1) signalling data, and the additional pilots, which are used for fractional frequency synchronization and channel equalization, as well as the data patterns, is based on OFDM. The first signalling data are transmitted in blocks or patterns of e.g. 4 MHz, but any other suitable size could be used. The only necessary condition is to have one complete signalling pattern within the tuning window, but this condition could be fulfilled by using two or more signalling patterns having a smaller size succeeding each other in the time direction as described in relation to FIG. 7. Therefore, the maximum bandwidth of the signalling pattern may be e.g. the tuning window of a state-of-the-art tuner, i.e. 7.61 MHz.). Some numerical examples are given in the following. In a first example, each signalling pattern 31; 31a, 31b covers exactly 4 MHz, while this corresponds to 1792 OFDM frequency carriers while having duration $T_u$ of the useful part of the OFDM symbol of 448 μs. In a second example, each signalling pattern covers 7.61 MHz (exactly 3409/448 usec), while this corresponds to 3409 OFDM carriers while having duration $T_U$ of the useful part of the OFDM symbol of 448 μs.

According to a first aspect, a pilot signal is mapped to every m-th frequency carrier 17 of a signalling pattern 31a, as schematically shown in FIG. 9 (m is an integer >1). It has to be clear, however, that this possibility equally applies to the signalling pattern 31 shown in FIG. 4, or generally to signalling patterns of any suitable length. The frequency carriers 16 in between the pilot signal carrying frequency carriers are carrying signalling data. The mapping of the first signalling data to the frequency carriers 16 and the mapping of the pilot signals 17 to every m-th frequency carrier is performed by the frequency to time transformation means 60 and the arrangement of the pilots and the first signalling data in the signalling pattern is performed by the frame forming means 59 comprised in the transmitting apparatus 82 as shown in FIG. 14. Generally, as stated above, the pilot signals form a pilot signal sequence. Hereby, the pilots are for example modulated against each other by a differential modulation scheme, such as but not limed to D-BPSK (differential binary phase shift keying). The modulation is for example obtained by means of a PRBS (pseudo random binary sequence register, e.g. 2^23−1). The repetition rate of m shall allow unambiguous D-BPSK decoding on the receiving side, such as the receiving apparatus 83 of the present invention as shown in FIG. 15, even for multi path channels. Repetition rates m are for example 7, 14, 28, . . . for 4 MHz signalling patterns since 7, 14, 28 . . . are dividers of 1792 (=number of frequency carriers in a 4 MHz signalling pattern). In this example, an advantageous repetition value is m=7. In other words, every 7-th frequency carrier carries a pilot signal even across adjacent signalling patterns. This example results in 256 pilot signals per 4 MHz signalling pattern. However, other repetition values than the above examples might be advantageous depending on the respective length of a signalling pattern and/or other factors. According to the invention, as described above, the data pattern(s) also carry pilot signals mapped on some of the frequency carriers in between the frequency carriers with the data, whereby it can be advantageous if the pilot signals are mapped on frequency carriers of the data pattern(s) in location which correspond to the frequency carriers in the signalling pattern(s) on which pilot signals are mapped. Generally, the density of the pilot signals in the data pattern(s) does not need to be as high as the density of the pilot signals in the signalling pattern(s). For example, if a pilot signal is mapped onto every m-th frequency carrier in the signalling pattern(s) (m being an integer >1), a pilot signal could be mapped onto every n-th frequency carrier of the data pattern(s), whereby n is an integer >1 and an integer multiple of m. As an advantageous example, if m=7, then n=28 (or any other suitable number). The pilot signals in the data pattern(s) could also form a pilot signal sequence as explained for the signalling pattern(s).

Regarding the creation of the pilot signal sequence for the signalling pattern(s) and the data pattern(s), which is for example a PN sequence, there are two options:

Option 1: Every signalling pattern in each frame carries a different pilot signal sequence. In the above example, the initialization of the PRBS register is aligned to the transmission frequency. 256 pilots are located within every frequency block of 4 MHz. The pilot signal sequence of each 4 MHz block is calculated separately. This allows a memory efficient implementation on receiver side.

Option 2: The pilot signal sequence is applied once for all the signalling patterns comprised in the complete transmission bandwidth. The receiver, e.g. the receiving apparatus 83, stores this known sequence, for example in a storage means, which can be part of or may be external to the integer frequency offset detection means 74, and extracts the frequency block that corresponds to its current tuning position.

All other carriers 16 within the signalling pattern are used for the transmission of the L1 signalling data. The start of the signalling data in each signalling pattern is always aligned to the 4 MHz structure, i.e. it always starts at multiples of 4 MHz in the depicted example. Each 4 MHz signalling pattern may carry exactly the same information, since the pilot signal sequences or the pilot signal sequence give the receiving apparatus 83 information about the location of the respective signalling pattern in each frame. Alternatively, each signalling pattern may additionally comprise the location of the signalling pattern in the frame. Further, in order to reduce the peak-to-average power ratio of the output time domain signal, the signalling data of each signalling pattern may be scrambled in the transmitter by a unique scrambling sequence, which may be obtained by means of the signalling pattern number.

In the receiving apparatus 83, the pilot signals comprised in the signalling pattern 31; 31a, 31b are used (after a time to frequency transformation of the received time domain symbols in the time to frequency transformation means 68) in an integer frequency offset detection means 74 to detect the integer frequency offset, the result of which is then used in the receiving apparatus 83 to perform integer frequency offset compensation in the frequency domain. More specifically, the pilots signals (which are for example D-BPSK modulated) comprised in the signalling patterns within the received frequency range are demodulated in a demodulation means 75 comprised in the integer frequency offset detection means 74. Then, a correlation means 76 comprised in the integer frequency offset detection means 74 performs a correlation of the demodulated pilot signal (pilot signal sequences) with the stored or generated (expected) pilot signal sequence, e.g. a PRBS sequence, in order to get aligned in the exact frequency offset. The correlation is done with the PRBS sequence that is expected at the beginning of the signalling pattern (can be listed in tables on receiver side). If the sequence is found within the received symbol, the receiving apparatus 83 knows the exact frequency offset and compensate it. More specifically, the obtained integer frequency offset can be supplied to and used in the reconstructing means 71 and the de-mapping means 72 for correctly demodulating the first signalling data, as well as supplied to and used in the channel estimation means 69 in order to perform the channel estimation and therefore the equalization.

The necessary time synchronization as well as the fractional frequency offset detection and compensation are for example done in the time domain on the received time domain symbols in the time synchronization means 66 and the fractional frequency offset detection means 67 using guard interval correlation using the guard intervals of the received signalling symbols and/or data symbols (cf. FIG. 13 showing a time domain representation of a frame with signalling symbols, data symbols, and guard intervals). The time synchronization could alternatively be done by performing a correlation of the absolute values between the received time domain symbols and a receiver generated time domain symbol, in which only pilot signals are modulated. A peak in the correlation of the received symbol and the receiver generated symbol allows an exact time synchronization.

According to a second aspect which is schematically shown in FIG. 10, each signalling pattern 31a (or signalling pattern 31) comprises at least one pilot band 18, 19 comprising pilot signals mapped on the frequency carriers 20, 21 of the pilot band 18, 19. The pilot bands 18, 19 respectively comprise a number of immediately adjacent frequency carriers on which pilot signals are mapped. The pilot bands 18, 19 may each have the same number of frequency carriers or a different number of frequency carriers. Hereby, each signalling pattern 31a may comprise a pilot band 18, 19 at its beginning or at its end (in the frequency direction). Alternatively, each signalling pattern may comprise a pilot band 18, 19 at each border, i.e. at the beginning and at the end of the pattern. All other statements and definitions made above in relation to the first aspect of the present invention also apply to the second aspect, including Option 1 and Option 2. It has to be understood that the first and the second aspect could be combined, i.e. each signalling pattern may comprise at least one pilot band 18, 19 as described above as well as pilot signals mapped on every m-th frequency carrier 12.

In both aspects of the present invention described above, the relation between number of frequency carriers with pilot signals and the number of frequency carriers with first signalling data in each signalling pattern might be variable and subject to the respective signalling and offset compensation requirements.

As schematically shown in FIG. 11, the transmitting apparatus 82 may blank (notch) certain regions 22, 23 of the overall transmission bandwidth in order to avoid disturbances from the cable network into other services, e.g. aircraft radio. Therefore, some part of the spectrum may not be modulated. In this case, the affected frequency carriers within the signalling pattern 31; 31a, 31b shall not be modulated as well. As the synchronization proposed by the present invention is very strong, this does not affect the frequency synchronization performance by means of the D-BPSK modulated pilots. The missing part of the first signalling data is recovered by means of the repetition of the first signalling data (every signalling pattern 31; 31a, 31b in a frame comprises identical or almost identical first signalling data), e.g. by combining parts from two adjacent signalling patterns as shown in FIG. 11, and eventually by means of the strong error protection added to the signalling patterns by a error coding means 56 comprised in the transmitting apparatus 82. Missing parts of first the signalling data at the edges of the transmission bandwidth shall be treated as very broad notches.

An alternative or additional possibility to deal with notches or other problems could be to subdivide the signalling pattern 31; 31*a*, 31*b* into two or more parts and to invert the sequence of the two or more parts in each signalling pattern (of a frame) from frame to frame. For example, if the first signalling pattern in a frame is subdivided in a first and a (succeeding) second part, the (corresponding) first signalling pattern in the immediately next frame would have the second part at the beginning and the first signalling part succeeding, i.e. an inverted sequence. Thus, if for example the second part is notched or otherwise disturbed, the receiver would have to wait for the next frame where the second part could be received without problems (since the succeeding first part would be disturbed).

An adaptation of the signalling patterns 31; 31*a*, 31*b* to different tuning bandwidths of the receiving side may for example be done by changing the distance of the frequency carriers in the signalling patterns. Alternatively, it is possible to keep the frequency carrier distance constant and to cut parts of the signalling patterns at the edges of the transmission bandwidth, e.g. by not modulating the respective frequency carriers, as schematically shown in FIG. 12, which shows the adaptation of a scheme with 4 MHz signalling patterns to a 6 MHz tuning bandwidth thus enabling the reception of data patterns having a length up to 6 MHz.

Eventually, each signalling pattern 31; 31*a*, 31*b* could additionally comprise a guard band at the beginning and the end of each pattern. Alternatively, in some applications it might be advantageous if only the first signalling pattern in each frame, in the example of FIG. 4 the signalling pattern at position 39, could comprise a guard band only at the beginning of the pattern, and the last signalling pattern in each frame could comprise a guard band only at the end of the pattern. Alternatively, in some applications only the first signalling pattern in each frame, in the example of FIG. 4 the signalling pattern at position 39, could comprise a guard band at the beginning as well as at the end of the pattern, and the last signalling pattern in each frame could comprise a guard band at the beginning as well as at end of the pattern. The length of the guard band comprised in some or all of the signalling patterns could for example be smaller or at maximum equal to the maximum frequency offset the receiving apparatus can cope with. In the mentioned example of a receiver bandwidth of 8 MHz, the guard band could for example have a length of 250 to 500 kHz or any other suitable length. Also, the length of each of the guard bands comprised in the signalling patterns could be at least the length of the carriers which are not received in the receiving apparatus due to the filter characteristics as described in relation to FIG. 6.

For example, in an OFDM system in which the overall transmission bandwidth is a multiple of 8 MHz (4nk mode: k is the Fourier window size of 1024 carriers/samples, n=1, 2, 3, 4 . . . ) and each signalling pattern has a length of 4 MHz, a suggestion for the length of each guard band at the beginning and the end of each signalling pattern would be 343 frequency carriers (which is the number of not used carriers in the data patterns at the beginning and end of each frame in each 4nk mode). The resulting number for usable carriers in each signalling pattern would be 3584/2−2×343=1106 carriers. It has to be understood, however, that these numbers are only used as examples and are not meant to be limiting in any sense.

Hereby, the length of each of the guard bands comprised in the signalling patterns could be at least the length of the carriers which are not received in the receiving apparatus due to the filter characteristics as described in relation to FIG. 6, so that the length of the signalling data in each signalling pattern is equal to (or may be smaller than) the effective receiver bandwidth. It should be noted that if additional signalling patterns 31*b* are present, they will have identical guard bands as the signalling patterns 31*a*.

Additionally or alternatively, each data pattern could comprise a guard band with unused carriers at the beginning and the end of each pattern. Alternatively, in some applications only the respective first data patterns in each frame in the frequency direction, in the example of FIGS. 10 and 13 the data patterns 32, 32', 32", 32'", 32"" could comprise a guard band only at the beginning of the data pattern, and the last data patterns in each frame in the frequency direction, in the example of FIGS. 4 and 7 the data patterns 37, 37', 37", 37'", 37"" could comprise a guard band at the end of the data pattern. Hereby, the length of the guard bands of the data patterns could for example be the same as the length of the guard bands of the signalling patterns if the signalling patterns comprise guard bands.

As stated above the first signalling data comprised in the signalling patterns 31, 31*a* and or 31*b* (or other signalling patterns according to the present invention) comprise the physical layer information, which enables a receiving apparatus 83 according to the present invention to obtain knowledge about the frame structure and to receive and decode the wanted data patterns. As a non limiting example, the first signalling data could comprise parameters such as the overall or entire transmission bandwidth, the location of the respective signalling pattern within the frame, the guard band length for the signalling patterns, the guard band length for the data patterns, the number of frames which build a super frame, the number of the present frame within a super frame, the number of data patterns in the frequency dimension of the overall frame bandwidth, the number of additional data patterns in the time dimension of a frame and/or individual signalling data for each data pattern in each frame. Hereby, the location of the respective signalling pattern within a frame can e.g. indicate the position of the signalling pattern in relation to the segmentation of the overall bandwidth. For example, in the case of FIG. 4, the first signalling data comprise indication if the signalling pattern is located in the first segment (e.g. the first 8 MHz segment), or the second segment etc. In case of the signalling patterns having half the length of the bandwidth segmentation, as e.g. explained in relation to FIG. 7, each pair of adjacent signalling patterns then has the same location information. In any case, the receiving apparatus will be able to tune to the wanted frequency band in the succeeding frame using this location information. The individual (first) signalling data are a separate block of data individually provided for each data pattern present in the frame and may comprise parameters such as the first frequency carrier of the data pattern, the number of frequency carriers allocated to the data pattern (or the length of a data pattern in terms of multiples of the minimum data pattern length in the frequency direction), the usage of a time interleaver for the data pattern, the number of frequency notches (frequency carriers which are not used for data transmission in data pattern) in the data pattern, the position of the frequency notches and/or the width of the frequency notches. The frame forming means 59 of the transmitting apparatus 82 is adapted to arrange the corresponding first signalling data in each signalling pattern. The evaluation means 73 of the receiving apparatus 83 is adapted to evaluate the received signalling data and to use or forward the information comprised in the first signalling data for further processing within the receiving apparatus 83.

In case that the first signalling data comprise the mentioned individual signalling information for each data pattern present in a frame, the structure of the signalling patterns support a maximum limited number of data patterns in the frequency direction per frame in order to restrict the size of each signalling pattern to a maximum size. Thus, although the number of data patterns in the frequency direction of each frame could be dynamically and flexible changed, this would then be true only within a certain maximum number of data patterns. The additional data patterns in the time direction of each frame are respectively aligned with the preceding data patterns, as explained above. Thus, each additional succeeding data pattern has the same position, length, modulation etc. as the preceding data pattern so that the signalling data for the preceding data pattern are also valid for the succeeding data pattern. Hereby, the number of additional data patterns in the time direction of each frame could be fixed or flexible and this information could also be comprised in the signalling data. Similarly, the structure of the signalling patterns could support only a maximum limited number of frequency notches in each data pattern.

Alternatively or additionally, in order to overcome the problem that parts of the signalling patterns 31 may not be receivable in the receiving apparatus 83, the transmitting apparatus 82 could optionally comprise an error coding means 56 arranged before the modulating means 55 and adapted to add some kind of error coding, redundancy, such as repetition coding, cyclic redundancy coding, or the like to the first signalling data. The additional error coding would enable the transmitting apparatus 82 to use signalling patterns 31 in the same length as the training patterns 30, as shown in FIG. 4 since the receiving apparatus 83 is able, for example, by means of the reconstruction means 71, to perform some kind of error detection and/or correction in order to reconstruct the original signalling pattern.

For the mentioned example of the signalling patterns having a length of 4 MHz and are aligned to segments of 8 MHz in an OFDM system, in the following a specific (non-limiting) example of a signalling structure is described.

For an OFDM symbol duration of 448 μs, each 4 MHz block is built by 1792 OFDM subcarriers. If a frequency domain pilot is used on every $7^{th}$ OFDM carrier within the signalling symbols 1536 OFDM carriers remain for the transmission of the L1 signalling data within each signalling OFDM symbol.

These OFDM carriers may be e.g. modulated by 16QAM, resulting in gross 6144 transmittable bits within the L1 signalling. Part of the transmittable bits have to be used for error correcting purposes, e.g. for a LDPC or Reed Solomon code. The remaining net bits are then used for the signalling, e.g. as described in the table below.

```
GI Length
Frame number
Total bandwidth
Total number of data slices
L1 sub-signalling table number
Number of sub-tabled data slices
Loop over data slices {
    Data slice number
    Start subcarrier frequency
    Number of subcarriers per slice
    Time Interleaver depth
    PSI/SI reprocessing
```

```
    Number of notches
    Loop over notches {
        Start of notch relative to start of slice
        Notch width
    } End notch loop
} End data slice loop
Reserved bits
CRC_32
```

In the following, the parameters of the signalling data mentioned in the above table are described in more detail:
GI Length:
  Defines the length of used Guard Interval
Frame Number:
  Counter which is increased every frame, i.e. each signalling symbol
Total bandwidth:
  The complete transmission bandwidth of the used channel
Total number of data slices:
  This parameter signals the total number of data slices, i.e. data patterns, in the used channel
L1 sub-signalling table number:
  Number of the sub-signalling table within the signalling data
Number of sub-tabled data slices:
  Number of data slices that are signalized within this L1 signalling table
Data slice number:
  Number of the current data slice
Start subcarrier frequency:
  Start frequency of the data slice
Number of subcarriers per slice:
  Number of subcarriers per data slice
Time interleaver depth:
  Time interleaving depth within the current data slice
PSI/SI reprocessing:
  Signalizes, whether PSI/SI reprocessing has been performed in the transmitter for the current data slice
Number of notches:
  Number of notches within the current data slice
Start of notch relative to start of slice:
  Start position of the notch within the data slice with respect to the start frequency of the data slice
Notch width:
  Width of the notch
Reserved bits:
  Reserved bits for future use
CRC_32:
  32 bit CRC coding for the L1 signalling block In order to ensure an even better reception of the signalling patterns in the receiving apparatus 83, the present invention further suggests to optimize the tuning position of the receiving apparatus 83. In the examples shown in FIGS. 4 and 7, the receiver is tuned to a part 38 of the transmission bandwidth by centering the part 38 around the frequency bandwidth of the data patterns to be received. Alternatively, the receiving apparatus 83 could be tuned so that the reception of the signalling pattern 31 is optimized by placing the part 38 so that a maximum part of a signalling pattern 31 is received while the wanted data pattern is still fully received. Alternatively, the length of the respective data patterns could not differ from the length of the respective signalling patterns 31 by more than a certain percentage for example 10%. An example for this solution can be found in FIG. 8. The borders between the data patterns 42, 43, 44 and 45 are (in the frequency direction) not deviating from the borders between the signalling patterns 31 by more than a certain percentage, such as (but not limited to) 10%. This small percentage can then be corrected by the above-mentioned additional error coding in the signalling patterns 31.

FIG. 13 shows a time domain representation of an example of frame 47 according to the present invention. In the transmitting apparatus 82, after the frame pattern or structure was generated in the frame forming means 59, the frequency domain frame pattern is transformed into the time domain by a frequency to time transforming means 60. An example of a resulting time domain frame is now shown in FIG. 13 and comprises a guard interval 49, a signalling symbol 50, a further guard interval 51 and a number of data symbols 52, which are respectively separated by guard intervals 53. While the situation that only a single signalling symbol is present in the time domain corresponds to the example shown in FIG. 4, where only a single time slot with signalling patterns is present in the frequency domain frame structure, the example of FIG. 7 with two time slots with signalling patterns 31a and 31b, respectively, would lead to the presence of two signalling patterns in the time domain, which are eventually separated by a guard interval. The guard intervals could e.g. be cyclic extensions of the useful parts of the respective symbols. In the example of an OFDM system, the signalling symbols and the data symbols, including their eventually provided guard bands, could respectively have the length of one OFDM symbol. The time domain frames are then forwarded to a transmitting means 61 which processes the time domain signal depending on the used multi-carrier system, for example by up-converting the signal to the wanted transmission frequency. The transmission signals are then transmitted via a transmitting interface 62, which can be a wired interface or a wireless interface, such as an antenna or the like. As mentioned above, the signalling patterns(s) could be preceded by one or more training patterns, which would lead to the presence of a training symbol preceding the signalling symbol in the time domain.

FIG. 13 further shows that a respective number of frames could be combined to super frames. The number of frames per super frame, i.e. the length of each super frame in the time direction, could be fixed or could vary. Hereby, there might be a maximum length up to which the super frames could be set dynamically. Further, it might be advantageous if the signalling data in the signalling patterns for each frame in a super frame are the same and if changes in the signalling data only occur from super frame to super frame. In other words, the modulation, coding, number of data patterns etc. would be the same in each frame of a super frame, but could then be different in the succeeding super frame. For example, the length of the super frames in broadcast systems could be longer since the signalling data might not change as often, and in interactive systems the super frame length could be shorter since an optimization of the transmission and reception parameters could be done on the basis of feedback from the receiver to the transmitter. As mentioned, a training symbol could precede each signalling symbol in each frame.

The elements and functionalities of the transmitting apparatus 82, a block diagram of which is shown in FIG. 14, have been explained before. It has to be understood, that an actual implementation of a transmitting apparatus 82 will contain additional elements and functionalities necessary for the actual operation of the transmitting apparatus in the respective system. In FIG. 14, only the elements and means necessary for the explanation and understanding of the present invention are shown. The same is true for the receiving apparatus 83, a block diagram of which is shown in FIG. 15. FIG. 15 only shows elements and functionalities necessary for the understanding of the present invention. Additional elements will be necessary for an actual operation of the receiving apparatus 83. It has to be further understood that the elements and functionalities of the transmitting apparatus 82 as well as the receiving apparatus 83 can be implemented in any kind of device, apparatus, system and so forth adapted to perform the functionalities described and claimed by the present invention.

As mentioned above, the data in the data patterns of the present invention, such as the data patterns in the frames with the frame structures 29 and 29' as shown in FIGS. 4 and 7, respectively, are arranged in data frames, wherein each data frame comprises second signalling data and content data. The second signalling data are hereby signalling data with individual parameters of the content data of the respective data frame, such as but not limited to the modulation used for the content data in the data frame, the error protection code used for the content data in the data frame, connection identification with information for the receiving apparatus if the content data comprise and the data frame are intended for the receiving apparatus or not, and so forth.

As shown in FIG. 17, a data frame 84 of the present invention could comprise the second signalling data in a header 84a, which is followed by the content data 84b (in the time direction). That is, FIG. 17 shows a data frame 84 of the present invention which is formed by the data frame forming means 54, 54', 54" of the transmitting apparatus 82 as shown in FIG. 14.

FIG. 18 schematically shows how several data frames are allocated to and inserted in data patterns which have the same frequency allocation and are adjacent in the time dimension, such as the data patterns 34, 34', 34", 34''' and 34'''' of the frames with the frame structures 29 and 29' shown in FIGS. 4 and 7, respectively. As shown in FIG. 18, several data frames 85, 85', 85" and 85''' of respectively different lengths (and/or different data and/or signalling content and/or different modulation and/or different coding) are allocated to the data patterns 34, 34', 34", 34''' and 34'''' in a completely independent and flexible manner. In other words, the length (number of frequency carriers) of the data frames 85, 85', 85" and 85''' is completely independent from the length (number of frequency carriers) of the data patterns 34, 34', 34", 34''' and 34'''' and the data frames 85, 85', 85" and 85''' are arranged succeeding each other in the data patterns 34, 34', 34", 34''' and 34''''. Thus the structure of the data frames generally is completely independent from the overall frame structure (e.g. frames with the frame structures 29 and 29'). However, the frequency structure, i.e. the first frequency carrier and the last frequency carrier of the data patterns 34', 34", 34''' and 34'''' is also the frequency structure of the data frames 85, 85', 85" and 85'''. The data patterns having the same frequency allocation and being adjacent to each other in the time dimension thus form a kind of a container for the data frames, which can be inserted into the container completely freely and independently. It is to be noted that FIG. 18 shows the data frame 85, 85', 85" and 85''' without being time and/or frequency interleaved for the sake of clarity. In an actual implementation, the data frame 85, 85', 85" and 85''' would be inserted into the data patterns 34, 34', 34", 34''' and 34'''' in time and/or frequency interleaved form.

The second signalling data contained in each header 85a, 85a', 85a" and 85a''' of each of the data frames 85, 85', 85", 85''' contains individual second signalling data for the respective data frame. In other words, the second signalling data comprised in the header 85a, 85a', 85a" and 85a''' are at least partially different from each other. The length of each data frame 85, 85', 85" and 85''' could be signalled either in the second signalling data of a frame or in the first signalling data is described above. As mentioned above, the second signalling data could comprise the modulation of the content data in the respective data frame, the (error) coding of the content data in the respective data frame and/or connection identification. Additional or alternative signalling content could be also comprised in the second signalling data depending on the wanted implementation. For example, the second signalling data could (implicitly or explicitly) comprise some indication of the length of the content data in a data frame. In some implementations, if the modulation and the coding is the same, the length of the content data is also the same. Thus, in case in which the modulation and the coding of the content data in succeeding data frames stays the same, it might not be necessary to signal (in the header of the succeeding data frame) the same modulation and coding again but to only indicate that the modulation and the coding stays the same as before. Alternatively, implementation might be possible where the header of a succeeding data frame can be omitted if the modulation and the coding do not change in relation to the preceding data frame.

The second signalling data of each data frame 85, 85', 85", 85''' advantageously comprise a synchronization sequence, such as a pseudo-noise sequence or any other suitable sequence, which is used in a correlation means 78 of the receiving apparatus 83 to perform a correlation in order to detect the start of each header 85a, 85a', 85a'''. Since the symbol synchronization has already taken place (was achieved e.g. by a multi-carrier demodulation), the result of the correlation performed in the correlating means 78 allows the de-mapping means 70 to correctly de-map and demodulate the second signalling data and the respective data frame. In an implementation example, the second signalling data are arranged in symbols and each of the symbols comprises a part of the synchronization sequence (each symbol comprises a number of bits). For example the most significant bit (or the most significant bits, e.g. 2, 3 or 4 etc. bits) of each symbol comprises the part of said synchronization sequence. For example, in case that the second signalling data are 16-QAM modulated, in which case the resulting 16-QAM symbols respectively comprise 4 bits, the most significant bit of each of the QAM symbols comprised in each of the headers 85a, 85a', 85a", 85a''' could comprise a part (one bit) of the synchronization sequence. Instead of the most significant bit(s), another bit or other bits could be used. The synchronization sequence can be any kind of suitable sequence, e.g. a pn, a PRBS or any other sequence.

FIG. 19 shows an example of a part of the transmitting apparatus 82 in more detail. Hereby, the second signalling data are encoded in an encoding means 86 and afterwards modulated, for example by QAM, QPSK or any other suitable method in a modulating means 87, where after the modulated and encoded second signalling data are supplied to a data frame forming means 54 or 54' or 54". The content data are coded in a coding means 88, which is for example a LDPC (low density parity check) encoder or any other suitable encoder, afterwards interleaved by a bit interleaver 89 and then modulated in a modulating means 58, 58', 58", which is for example a QAM or any other suitable encoder. The coded interleaved and modulated content data are then supplied to a data frame forming means 54 (or 54' or 54"). The data frame forming means 54, 54', 54" then forms respective data frames as explained in relation to FIGS. 17 and 18. Therefore, the block size of the coding performed by the coding means 88 for the content data in each data frame can be varied for each data frame, thus allowing a varying robustness level for the data frames. The coding performed in the coding means 88 as well as the modulation performed in the modulating means 90 are respectively signalled in the second signalling data of the respective header of the data frame. The modulation performed by the modulating means 87 on the second signalling data is e.g. a 16 QAM modulation (as described in more detail in relation to FIG. 20) or a QPSK modulation (as described in more detail in relation to FIG. 21), but any other robust modulation can be used.

FIG. 20 shows a first example of a more detailed implementation of the generation of a header with second signalling data. In the shown example, a 16 QAM modulation is performed by the modulating means 87 on the second signalling data. Thus, a QAM symbol has 4 bits. The most significant bit in each of the symbols is used for a part of the pseudo-noise sequence (pn sequence). The other three bits of each QAM symbol carry the payload of the signalling data, such as the (error) coding of the content data, the modulation of the content data and/or the connection identification. For example, the modulation information is comprised in 3 bits, the connection identification is comprised in 8 bits and the coding information is comprised in 4 bits, resulting a 15 bit payload for a second signalling data. These 15 bits are repeated in a repeater 91, for example 3 times. Then, the second signalling data are encoded in an encoding means 86, which is for example a Reed Solomon coding means and then supplied to the modulating means 87. The modulating means 87 therefore outputs 45 symbols (the pseudo-noise sequence has a length of 45 bits, each of the bits being used as the most significant bit of each of the 45 symbols). It has to be noted, however, that the given numbers are only examples and can be changed depending on the respective implementation.

FIG. 21 shows a second example of a more detailed implementation of the generation of a data frame header with second signalling data. In contrary to the first example of FIG. 20, in which the synchronization sequence is inserted in the second signalling data, this second example suggests to modulate the synchronization sequence onto the second signalling data. Further, the second example suggests to feed the second signalling data to an I and a Q path of the modulating means and to resort (i.e. to reorder) the data in the I or the Q path (for example by delaying it or by shifting it), while modulating the synchronization sequence onto one of the paths. Hereby, the diversity of the second signalling data is achieved which results in improved decoding properties on the receiving side. In the second example, modulation, e.g. a QPSK modulation, is performed by the modulating means 87 on the second signalling data. A QPSK modulation is more robust than a 16 QAM modulation as described in the example of FIG. 20. A QPSK symbol comprises 2 bits, whereby each symbol carries a part of a synchronization sequence, which could for example be a pn sequence, a PRBS sequence or any other suitable sequence with good correlation properties, as generally explained in relation to FIG. 19. In the implementation example of FIG. 21, the encoding means 86 is for example a BCH encoder (Block Code Encoder) which encodes the second signalling data, which could for example be represented by 15 bits, 18 bits or the like (for example the BCH encoder could be a BCH (18, 45) encoder). The encoding means 86 then outputs e.g. 45 bits of encoded second signalling data which are then fed to an I and a Q path of the modulating means 87. In the I path, the 45 encoded signalling bits are fed to the modulating means 87 in unchanged form. However, in the Q path, the encoded signalling bits are resorted by any suitable resorting process, e.g. delayed (e.g. delayed by a one bit cyclic shift), shifted, reordered or the like, in a resorting means 90, where after the synchronization sequence (for example a pn sequence, a PRBS sequence any other suitable synchronization sequence with good correlation properties) is modulated onto the resorted bits by means of a combining means 92, which performs for example a XOR operation or any other suitable operation. The synchronization sequence for example also comprises 45 bits, so that in cases the resorting means 90 introduces a one bit cyclic shift, each shifted bit of the Q path is modulated with one bit of the synchronization sequence. The resorted bits with the modulated synchronization sequence are then supplied on the Q path to the modulating means 87, which performs e.g. a QPSK modulation on the signals supplied via the I and Q path. The modulating means 87 then outputs modulated second signalling information in form of symbols, in the present example 45 symbols in each header of each data frame. Each symbol comprises a number of bits (in the QPSK example two bits), wherein, in the present example one of the bits is modulated with one bit from the synchronization sequence. Generally, a part of the synchronization sequence is modulated onto one or more of the bits of each symbol. It has to be understood that instead of the Q path, the I path could be delayed and modulated with the synchronization sequence. As shown in FIG. 19, the modulated second signalling data are then supplied from the modulating means 87 to the data frame forming means 54 (or 54' or 54") as shown and described in relation to FIG. 19.

FIG. 22 shows an implementation detail of the receiving apparatus 83 as shown in FIG. 15 for the implementation example of FIG. 21. FIG. 22 hereby shows an implementation example for the synchronization detection of the data frames by means of the synchronization sequence comprised in each data frame header. As shown in FIG. 22, the data output from the time de-interleaver 77 are supplied to a demodulating means 93, for example a hard decision demodulating means, such as, in the context of the example of FIG. 21, e.g. a QPSK de-mapping means, which e.g. QPSK demodulates the second signalling data and outputs the demodulated data in a I and Q path. A resorting means 94 in the I path resorts, e.g. delays, shifts or the like, the data in order to at least partially compensate the resorting introduced to the data in the Q path by the resorting means 90 as shown in FIG. 21. It has to be noted that the operation performed by the resorting means 94 can but does not need to be fully reversible to the operation performed by the sorting means 90. Also, if the resorting means 90 is located in the I path, the resorting means 94 is located in the Q path. Then, the data on the I path are multiplied with the data on the Q path in a multiplication means 95, which results in the synchronization sequence, which was modulated onto the data frame header, and which is output to the correlating means 78, which performs a correlation with the known (expected) synchronization sequence and outputs a synchronization peak enabling the detection of a data frame header and thus of a data frame beginning. The resulting information is then for example supplied to the de-mapping means 70 as shown and described in relation to FIG. 15.

FIG. 23 shows an implementation detail of the receiving apparatus 83 as shown in FIG. 15 in relation to the examples of FIGS. 21 and 22. Hereby, FIG. 23 comprises a suggestion for an implementation in order to obtain and evaluate the second signalling data contained in the data frame headers (as for example generally described in relation to the evaluation means 79 of the receiving apparatus 83 shown in FIG. 15). Hereby, in the example of FIG. 23, the data stream coming from the time de-interleaver 77 of the receiving apparatus 83 of FIG. 15 is supplied to a de-mapping means 96, which is for example a soft decision QPSK de-mapping means. The de-mapping means 96 QPSK demodulates the data and outputs them in an I and a Q path. Advantageously, the data are output in a log likelihood ratio form. In the Q path, the data are modulated in a combining means 97 with an expected copy (or suitably processed copy) of the synchronization sequence comprised in the data frame headers (modulated onto the second signalling data in the transmitting apparatus 82), where after the data are resorted (e.g. delayed, shifted or the like) in a resorting means 98 in order to reverse the resorting introduced by the resorting means 90 to the data in the Q path as shown in FIG. 21. It has to be noted that the resorting performed by the resorting means 98 should be fully reversible to the resorting introduced by the resorting means 90. Also, the resorting means 98 as well as the combining means 97 should be located in the I path in case that the resorting means 90 and the combining means 92 are located in the I path. Afterwards, the data of the I and the Q path are summed in an adding means 99, where after a hard decision is applied to the added data in a hard decision means 100. The output of the hard decision means is then decoded in a decoding means 101, for example a block code decoding means which decodes the coding introduced by the encoding means 86 of FIG. 21. The output of the decoding means 101 are then the original second signalling data, as for example the bits or 18 bits second signalling data as supplied to the encoding means 86 of FIG. 21. These second signalling data are then used for the further processing, for example supplied to the de-mapping means 70 and/or the error decoding means 80 of the receiving apparatus 83 of FIG. 15. It should be noted that the delaying means 98 could alternatively be implemented in the I path. Also, additionally or alternatively, the I and the Q path could be decoded separately and the path with the better decoding result could be further used.

The ordering of the second signalling data and the content data in data frames and to allocate the data frames to the data patterns in an independent and flexible manner has the advantage that a reduced processing in the receiving apparatus 83 is necessary. Further, only short delays for interactive services are guaranteed. As shown in FIG. 15, the receiving apparatus 83, after the correlating means 78 providing the correlation of the synchronization (pseudo-noise) sequence of the second signalling data, comprises an evaluation means 79 which is adapted to evaluate the received second signalling data, eventually after a necessary decoding corresponding to the coding performed by the encoding means 86, a demodulation (e.g. QAM demodulation) corresponding to the modulation performed by the modulating means 87 or other necessary processing. However, the signalling information obtained by the evaluation means 79 is supplied to the de-mapping means 70. For example, the evaluation means 79 can be adapted to obtain the modulation of the content data from the second signalling data and provide the de-mapping means 70 with the modulation information so that the de-mapping means 70 can perform the respectively necessary demodulation on the content data of the data frame. Further, the evaluation means 79 may be adapted to obtain the error coding of the content data in a data frame and to provide an error decoding means 80 located in the receiving apparatus 83 so that the error decoding means 80 is adapted to perform an error decoding on the content data of a received data frame. Further, the evaluation means 79 may be adapted to obtain connection information in the second signalling data of a received data frame and to provide a suitable processing means of the receiving apparatus 83 with the connection information informing the receiving apparatus 83 if the content data of a received data frame are actually intended to be received by the receiving apparatus 83 or not.

It is to be noted that the present invention is intended to cover a frame structure (and a correspondingly adapted transmitting and receiving apparatus and method as described above), which, as an alternative to the above described embodiments, does have a number (two or more) data patterns in which at least one data pattern has a length which is different from the length of the other data pattern(s). This structure of data patterns with a variable length can be combined either with a sequence of signalling patterns with identical lengths and (identical or almost identical) contents as described above, or with a sequence of signalling patterns in which at least one signalling pattern has a length and/or a content different from the other signalling patterns, i.e. a variable signalling pattern length. In both cases, the receiving apparatus 83 will need some information about the varying data pattern length, which could be transmitted by means of a separate signalling data channel or by means of signalling data comprised in signalling data patterns comprised in the frame structure as described above. In the later case, it might be a possible implementation if the first signalling patterns in each frame always have the same length so that the receiving apparatus can always obtain the information about the varying data patterns by receiving the first signalling patterns in every or the necessary frames. Of course, other implementations might be possible. Otherwise, the rest of the above description in relation to the data patterns and the signalling patterns as well as the possible implementations in the transmitting apparatus 82 and the receiving apparatus 83 is still applicable.

The invention claimed is:

1. A transmitting apparatus for transmitting signals in a multi carrier system on the basis of a frame structure, said transmitting apparatus comprising a frame former that forms frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, that arranges first signaling data in each of said at least two signaling patterns in a frame, and that arranges data in said one or more data patterns in a frame, whereby the data of said one or more data patterns are arranged in data frames, each data frame comprising second signaling data and content data;
   a transformer that transforms said at least two signaling patterns and said one or more data patterns from the frequency domain into the time domain to generate a time domain transmission signal; and
   a transmitter that transmits said time domain transmission signal.

2. The transmitting apparatus according to claim 1, wherein the second signaling data in each data frame are arranged in a header of the data frame.

3. The transmitting apparatus according to claim 1, wherein the second signaling data comprise a synchronization sequence.

4. The transmitting apparatus according to claim 3, wherein the second signaling data are arranged in symbols and a part of said synchronization sequence is inserted in each symbol.

5. The transmitting apparatus according to claim 3, wherein the second signaling data are arranged in symbols and a part of said synchronization sequence is modulated onto at least a part of each symbol.

6. The transmitting apparatus according to claim 1, wherein at least one of said data patterns in a frame is followed by at least one additional data pattern in the time direction with the same frequency direction structure as said at least one of said data patterns, wherein data frames arranged in said at least one of said data patterns and the at least one additional data pattern are arranged succeeding each other independent of said frequency structure.

7. A transmitting method for transmitting signals in a multi carrier system on the basis of a frame structure, the method comprising:
   forming frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data pattern comprising a plurality of frequency carriers,
   arranging signaling data in each of said at least two signaling patterns in a frame;
   arranging data in said one or more data patterns in a frame, whereby the data of said one or more data patterns are arranged in data frames, each data frame comprising second signaling data and content data;
   transforming said at least two signal patterns and said one or more data patterns from the frequency domain into the time domain in order to generate a time domain transmission signal; and
   transmitting said time domain transmission signal.

8. A receiving apparatus for receiving signals in a multi carrier system on the basis of a frame structure in a transmission bandwidth, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, whereby signaling data are arranged in each of said at least two signaling patterns in a frame, whereby the data of said one or more data patterns are arranged in data frames, each data frame comprising second signaling data and content data, said receiving apparatus comprising:
   a receiver configured to be tuned to and to receive a selected part of said transmission bandwidth, said selected part of said transmission bandwidth covering at least one data pattern to be received;
   an evaluator configured to evaluate said second signaling data comprised in a received data frame; and a data de-mapper configured to de-map data from frequency carriers of a received data frame on the basis of the result of said evaluation.

9. The receiving apparatus according to claim 8, wherein said second signaling data includes modulation of said data in said received data frame, wherein said evaluator is configured to obtain the modulation and said data de-mapper is configured to perform a demodulation of data from frequency carriers of said received data frame on the basis of the obtained modulation.

10. The receiving apparatus according to claim 8, wherein said second signaling data includes an error coding of said data in said received data frame, wherein said evaluator is configured to obtain the error coding and forward the error coding to an error decoder configured to perform an error decoding on data of said received data frame.

11. The receiving apparatus according to claim 8, wherein said second signaling data includes connection identification and said evaluator is configured to obtain said connection identification.

12. The receiving apparatus according to claim 8, further comprising a correlator configured to perform a correlation on a synchronization sequence comprised in said second signaling data of a received data frame, wherein said data de-mapper is configured to de-map said data from frequency carriers of said received data frame on the basis of the result of said correlation.

13. A receiving method for receiving signals in a multi carrier system on the basis of a frame structure in a transmission bandwidth, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, whereby signaling data are arranged in each of said at least two signaling patterns in a frame, whereby the data of said one or more data patterns are arranged in data frames, each data frame comprising second signaling data and content data, the receiving method comprising:
receiving a selected part of said transmission bandwidth, said selected part of said transmission bandwidth covering at least one data pattern to be received;
evaluating said second signaling data included in a received data frame; and
de-mapping data from frequency carriers of a received data frame on the basis of the result of said evaluation.

14. A system for transmitting and receiving signals, comprising a transmitting apparatus for transmitting signals in a multi carrier system on the basis of a frame structure, said transmitting apparatus comprising
a frame former that forms frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, that arranges first signaling data in each of said at least two signaling patterns in a frame, and that arranges data in said one or more data patterns in a frame, whereby the data of said one or more data patterns are arranged in data frames, each data frame comprising second signaling data and content data;
a transformer that transforms said at least two signaling patterns and said one or more data patterns from the frequency domain into the time domain to generate a time domain transmission signal; and
a transmitter that transmits said time domain transmission signal; and
a receiving apparatus according to claim 9 that receives said time domain transmission signal from said transmitting apparatus.

15. A method for transmitting and receiving signals, comprising a transmitting method for transmitting signals in a multi carrier system on the basis of a frame structure, comprising:
forming frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data pattern comprising a plurality of frequency carriers,
arranging signaling data in each of said at least two signaling patterns in a frame;
arranging data in said one or more data patterns in a frame, whereby the data of said one or more data patterns are arranged in data frames, each data frame comprising second signaling data and content data;
transforming said at least two signal patterns and said one or more data patterns from the frequency domain into the time domain in order to generate a time domain transmission signal; and
transmitting said time domain transmission signal; and
a receiving method according to claim 13 for receiving said time domain transmission signal.

16. A transmitting apparatus for transmitting signals in a multi carrier system on the basis of a frame structure, said transmitting apparatus comprising a frame forming means for forming frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, for arranging first signaling data in each of said at least two signaling patterns in a frame, and for arranging data in said one or more data patterns in a frame, whereby the data of said one or more data patterns are arranged in data frames, each data frame comprising second signaling data and content data;
- a transforming means for transforming said at least two signaling patterns and said one or more data patterns from the frequency domain into the time domain in order to generate a time domain transmission signal; and
- a transmitting means for transmitting said time domain transmission signal.

17. A receiving apparatus for receiving signals in a multi carrier system on the basis of a frame structure in a transmission bandwidth, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, whereby signaling data are arranged in each of said at least two signaling patterns in a frame, whereby the data of said one or more data patterns are arranged in data frames, each data frame comprising second signaling data and content data, said receiving apparatus comprising:
- a receiving means configured to be tuned to and to receive a selected part of said transmission bandwidth, said selected part of said transmission bandwidth covering at least one data pattern to be received;
- an evaluation means for evaluating said second signaling data comprised in a received data frame; and
- a data de-mapping means for de-mapping data from frequency carriers of a received data frame on the basis of the result of said evaluation.

18. A system for transmitting and receiving signals, comprising:
- a transmitting apparatus for transmitting signals in a multi carrier system on the basis of a frame structure, said transmitting apparatus comprising
  - a frame forming means for forming frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, for arranging first signaling data in each of said at least two signaling patterns in a frame, and for arranging data in said one or more data patterns in a frame, whereby the data of said one or more data patterns are arranged in data frames, each data frame comprising second signaling data and content data;
  - a transforming means for transforming said at least two signaling patterns and said one or more data patterns from the frequency domain into the time domain in order to generate a time domain transmission signal; and
  - a transmitting means for transmitting said time domain transmission signal; and
- a receiving apparatus according to claim 17 for receiving said time domain transmission signal from said transmitting apparatus.

* * * * *